(12) United States Patent
Herigstad et al.

(10) Patent No.: US 12,248,654 B1
(45) Date of Patent: Mar. 11, 2025

(54) SYSTEMS AND METHODS FOR GENERATING AND ENABLING INTERACTION WITH AN EXTENDED REALITY USER INTERFACE

(71) Applicant: Isovist Limited, London (GB)

(72) Inventors: Dale Alan Herigstad, London (GB); Jack Turpin, Los Angeles, CA (US); Eric Fanghanel Santibanez, London (GB)

(73) Assignee: ISOVIST LIMITED, London (GB)

( * ) Notice: Subject to any disclaimer, the term of this patent is extended or adjusted under 35 U.S.C. 154(b) by 15 days.

(21) Appl. No.: 18/444,179

(22) Filed: Feb. 16, 2024

(51) Int. Cl.
| | | |
|---|---|---|
| *G06F 3/04815* | (2022.01) | |
| *G06F 3/01* | (2006.01) | |
| *G06F 3/0482* | (2013.01) | |
| *G06F 3/0485* | (2022.01) | |
| *G06F 3/0488* | (2022.01) | |

(52) U.S. Cl.
CPC .......... *G06F 3/04815* (2013.01); *G06F 3/017* (2013.01); *G06F 3/0482* (2013.01); *G06F 3/0485* (2013.01); *G06F 3/0488* (2013.01); *G06F 2203/04808* (2013.01)

(58) Field of Classification Search
CPC .... G06F 3/04815; G06F 3/017; G06F 3/0482; G06F 3/0485; G06F 3/0488; G06F 2203/04808
See application file for complete search history.

(56) References Cited

U.S. PATENT DOCUMENTS

| | | | | |
|---|---|---|---|---|
| 9,652,030 | B2 * | 5/2017 | Yeung | G06V 40/10 |
| 2011/0119640 | A1 * | 5/2011 | Berkes | G06F 3/0304 |
| | | | | 715/863 |
| 2013/0009865 | A1 * | 1/2013 | Valik | G06F 3/0304 |
| | | | | 345/156 |
| 2016/0239201 | A1 * | 8/2016 | Wang | G06F 3/0416 |
| 2017/0228130 | A1 * | 8/2017 | Palmaro | G06F 3/0482 |
| 2018/0300008 | A1 * | 10/2018 | Rasanen | G06F 3/04886 |
| 2021/0264140 | A1 * | 8/2021 | Hill | G06V 40/20 |
| 2022/0253149 | A1 * | 8/2022 | Berliner | G06F 3/012 |
| 2022/0270509 | A1 * | 8/2022 | Josephson | G06T 19/00 |
| 2023/0130770 | A1 * | 4/2023 | Miller | G06N 20/00 |
| | | | | 345/156 |

* cited by examiner

*Primary Examiner* — David D Davis
(74) *Attorney, Agent, or Firm* — ARENTFOX SCHIFF LLP

(57) ABSTRACT

Systems and methods are described for generating and interacting with an extended reality user interface. For example, a system may detect a launch of an extended reality application on a computing device. The system may generate, in a first virtual zone of a plurality of virtual zones of an extended reality user interface, a first plurality of selectable elements. The system may identify, by a camera, a surface in a real world environment of the computing device and map the plurality of virtual zones to a plurality of physical zones on the surface. The system may detect, by the camera, a first gesture over a first physical zone of the plurality of physical zones. In response to determining that the first physical zone corresponds to the first virtual zone, the system may execute a first interaction action on the first plurality of selectable elements based on the first gesture.

20 Claims, 35 Drawing Sheets

SYSTEMS AND METHODS FOR GENERATING AND ENABLING INTERACTION WITH AN EXTENDED REALITY USER INTERFACE

FIELD OF TECHNOLOGY

The present disclosure relates to the field of extended reality technologies, and, more specifically, to systems and methods for generating and enabling interaction with an extended reality user interface.

BACKGROUND

Augmented reality (AR), virtual reality (VR), and mixed reality (MR) represent a transformative wave of technological innovation that intertwines the digital and physical worlds. These extended reality technologies seamlessly blend computer-generated content with a real-world environments. The complexity of AR/VR/MR arises from the interplay of hardware and software components required to create immersive and convincing visuals. On the hardware front, sophisticated sensors, cameras, and display systems work in tandem to accurately capture eye/hand motion and also recreate the user's surroundings. Simultaneously, robust software algorithms process vast amounts of data in real-time, enabling precise tracking of movements and interactions.

Despite the capabilities of extended reality technologies in rendering complex visuals with an increasingly high number of interactable visual elements, such technologies struggle to provide user interfaces that enable ease of access to said visual elements and natural/instinctual interaction. Even in situations with a large number of interactable visual elements, conventional user interfaces employ clunky reach and grab/touch motions that often translate improperly in the digital environment and result in incorrect selections. The poor-performance user interfaces are a result of limits in hardware and software. For example, onboard sensors may be unable to accurately discern depth and positional differences between crowded visual elements (especially in three-dimensional elements disposed at varying lengths that give the illusion of overlap from the camera perspective). In another example, poorly written user interface code may expend great memory and processing power unnecessarily to execute reach and grab motions in crowded digital environments. This reduces the resources available to perform other software features (e.g., rendering visual elements) and ultimately leads to inefficient execution of the extended reality software.

SUMMARY

In one exemplary aspect, the techniques described herein relate to a method for generating and interacting with an extended reality user interface, the method including detecting a launch of an extended reality application on a computing device. The method may further include generating, in a first virtual zone of a plurality of virtual zones of an extended reality user interface, a first plurality of selectable elements in the extended reality application. The method may further include identifying a surface in a real world environment of the computing device. The method may further include mapping the plurality of virtual zones to a plurality of physical zones on the surface. The method may further include detecting a first gesture over a first physical zone of the plurality of physical zones. The method may further include in response to determining that the first physical zone corresponds to the first virtual zone, executing a first interaction action on the first plurality of selectable elements based on the first gesture.

In some aspects, the techniques described herein relate to a method, further including: detecting a physical object that includes the surface in the real world environment; generating, on the extended reality user interface, a virtual object that visually corresponds to the physical object; and generating a visual of the first gesture on the virtual object.

In some aspects, the techniques described herein relate to a method, further including: receiving a request to change the surface; in response to receiving the request, identifying, by a camera, another surface in the real world environment; and mapping the plurality of virtual zones to a plurality of physical zones on the another surface.

In some aspects, the techniques described herein relate to a method, wherein the request includes a selection of the another surface.

In some aspects, the techniques described herein relate to a method, wherein the surface is one of: a hand of a user and a flat surface in front of the user.

In some aspects, the techniques described herein relate to a method, wherein the first gesture is associated with a selection, and wherein executing the first interaction action includes: selecting a first element from the first plurality of selectable elements, wherein a virtual location of the first element in the first virtual zone corresponds to a physical location last touched in the first physical zone during the first gesture; and generating an output view associated with the first element in a primary virtual zone of the plurality of virtual zones.

In some aspects, the techniques described herein relate to a method, wherein the first gesture is associated with a vertical scroll with a single finger, and wherein executing the interaction action includes: sliding the plurality of selectable elements along a vertical axis until a desired selectable element enters a fixed indicator, wherein a direction of the sliding corresponds to a direction of the first gesture on the surface.

In some aspects, the techniques described herein relate to a method, wherein the first gesture is associated with a vertical scroll with two fingers, wherein the first plurality of selectable elements are organized in more than one column, and wherein executing the interaction action includes: sliding across the more than one column arranged along a depth axis, wherein a direction of the sliding is based on a direction of the first gesture on the surface.

In some aspects, the techniques described herein relate to a method, wherein a second virtual zone of the plurality of virtual zones outputs a second plurality of selectable elements, further including: detecting, by a camera, a second gesture over a second physical zone of the plurality of physical zones; in response to determining that the second physical zone corresponds to the second virtual zone of the plurality of virtual zones, executing another interaction action on the second plurality of selectable elements based on the second gesture.

In some aspects, the techniques described herein relate to a method, wherein the extended reality application has one or more of virtual reality features, augmented reality features, and mixed reality features.

It should be noted that the methods described above may be implemented in a system comprising a hardware processor. Alternatively, the methods may be implemented using computer executable instructions of a non-transitory computer readable medium.

In some aspects, the techniques described herein relate to a system for generating and enabling interaction with an extended reality user interface, including at least one memory and at least one hardware processor coupled with the at least one memory. The at least one hardware processor may be configured, individually or in combination, to detect a launch of an extended reality application on a computing device. The at least one hardware processor may be configured, individually or in combination, to generate, in a first virtual zone of a plurality of virtual zones of an extended reality user interface, a first plurality of selectable elements in the extended reality application. The at least one hardware processor may be configured, individually or in combination, to identify a surface in a real world environment of the computing device. The at least one hardware processor may be configured, individually or in combination, to map the plurality of virtual zones to a plurality of physical zones on the surface. The at least one hardware processor may be configured, individually or in combination, to detect a first gesture over a first physical zone of the plurality of physical zones. The at least one hardware processor may be configured, individually or in combination, to in response to determining that the first physical zone corresponds to the first virtual zone, execute a first interaction action on the first plurality of selectable elements based on the first gesture.

In some aspects, the techniques described herein relate to a non-transitory computer readable medium storing thereon computer executable instructions for generating and enabling interaction with an extended reality user interface. The non-transitory computer readable medium may include instructions for detecting a launch of an extended reality application on a computing device. The non-transitory computer readable medium may include instructions for generating, in a first virtual zone of a plurality of virtual zones of an extended reality user interface, a first plurality of selectable elements in the extended reality application. The non-transitory computer readable medium may include instructions for identifying a surface in a real world environment of the computing device. The non-transitory computer readable medium may include instructions for mapping the plurality of virtual zones to a plurality of physical zones on the surface. The non-transitory computer readable medium may include instructions for detecting a first gesture over a first physical zone of the plurality of physical zones. The non-transitory computer readable medium may include instructions for in response to determining that the first physical zone corresponds to the first virtual zone, executing a first interaction action on the first plurality of selectable elements based on the first gesture.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for generating and enabling interaction with an extended reality user interface. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
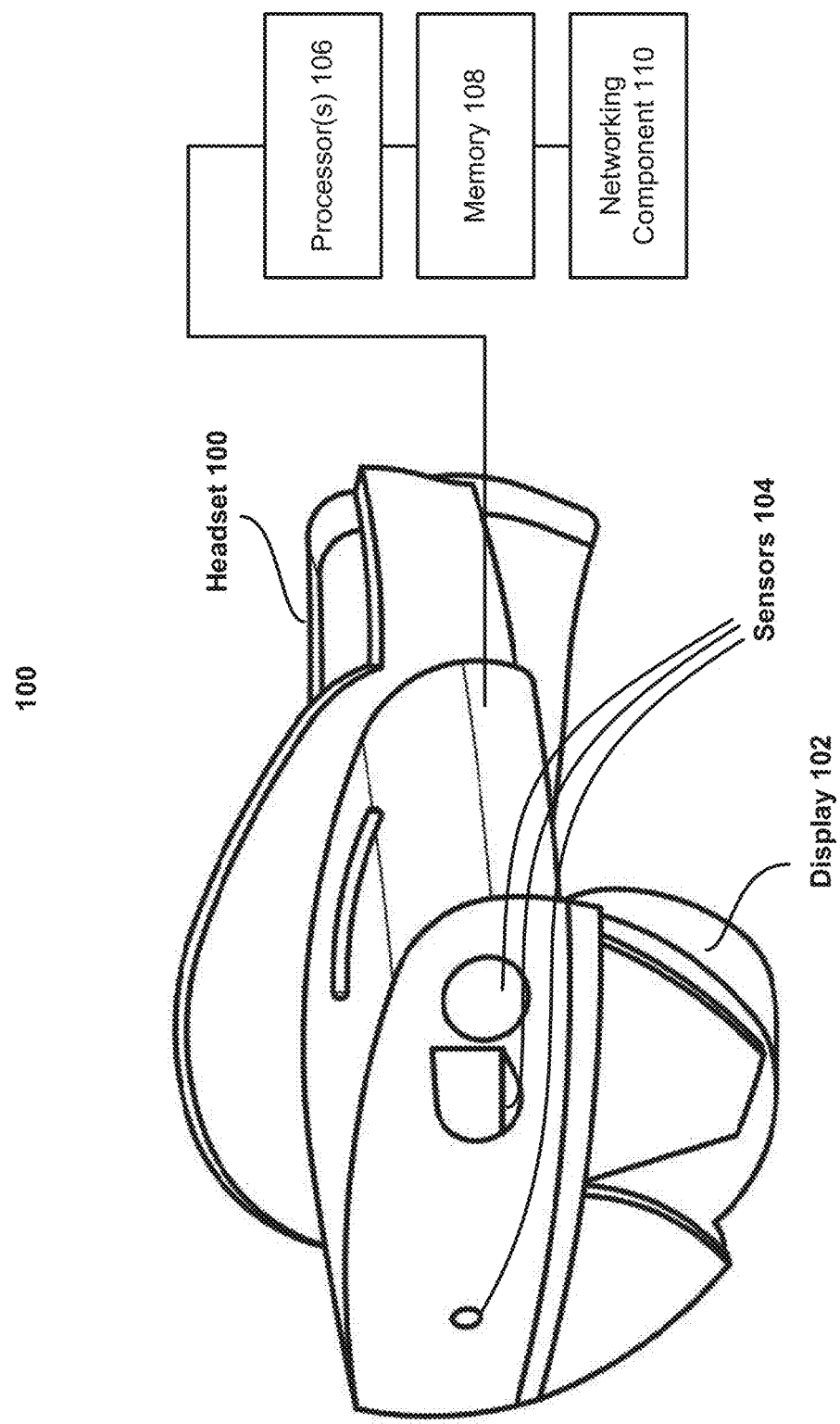
FIG. 1 is a block diagram illustrating an extended reality device.

FIG. 1 is a block diagram illustrating an extended reality device 100. Extended reality device 100 may include one or more hardware processors 106 couple with one or more memories 108 that execute and store instructions (e.g., code) of extended reality user interface module 101 (XR UI module 101). XR UI module 101 may be part of an extended reality software application and is configured to generate and enable interaction with an extended reality user interface.

Extended reality device 100 may further include networking component 110, which enables wired and/or wireless communication with other devices (e.g., enables a Wi-Fi or Bluetooth connection with other device(s) such as a smartphone). In some aspects, extended reality device 100 may be a headset that incudes sensors 104 (e.g., infrared sensor, laser, camera, accelerometer, gyroscope, etc.). When worn, one of sensors 104 (e.g., a laser) may project visuals on display 102. In some aspects, display 102 may be a transparent surface that enables the user to view the physical environment and the visuals projected onto display 102 simultaneously and seamlessly. In other aspects, display 102 may be a non-transparent display comprising a plurality of pixels. In this approach, display 102 may present a visual of the physical environment (e.g., an output of a camera feed) and the visuals of the extended reality user interface using the pixels of display 102.

Figure 2:
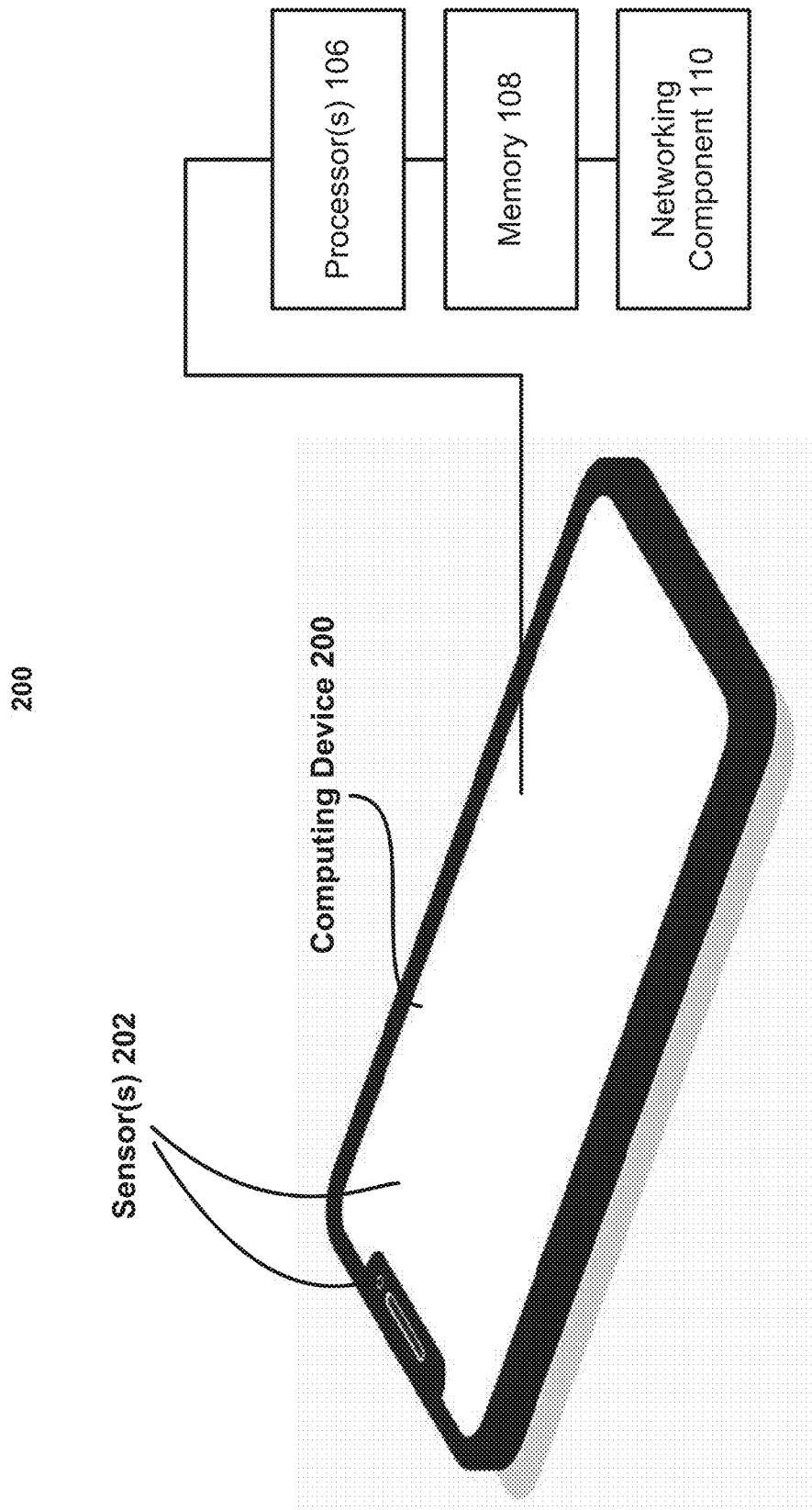
FIG. 2 is a block diagram illustrating a computing device capable of outputting VR and AR visuals.

FIG. 2 is a block diagram illustrating a computing device 200 capable of outputting VR and AR visuals. In some aspects, rather than using a headset, a user may use computing device 200 (e.g., a smartphone) to access an extended reality user interface. Computing device 200 includes hardware processor(s) 106, memory 108, and networking component 110 and executes XR UI module 101. Similarly to extended reality device 100, computing device 200 may include sensor(s) 202 such as a camera, a touch-sensitive layer of display 204, an accelerometer, etc. In an exemplary aspect, display 204 is a non-transparent display comprising a plurality of pixels. Display 204 may present a visual of the physical environment (e.g., an output of a camera feed) and the visuals of the extended reality user interface using the pixels of display 204.

Figure 3A:
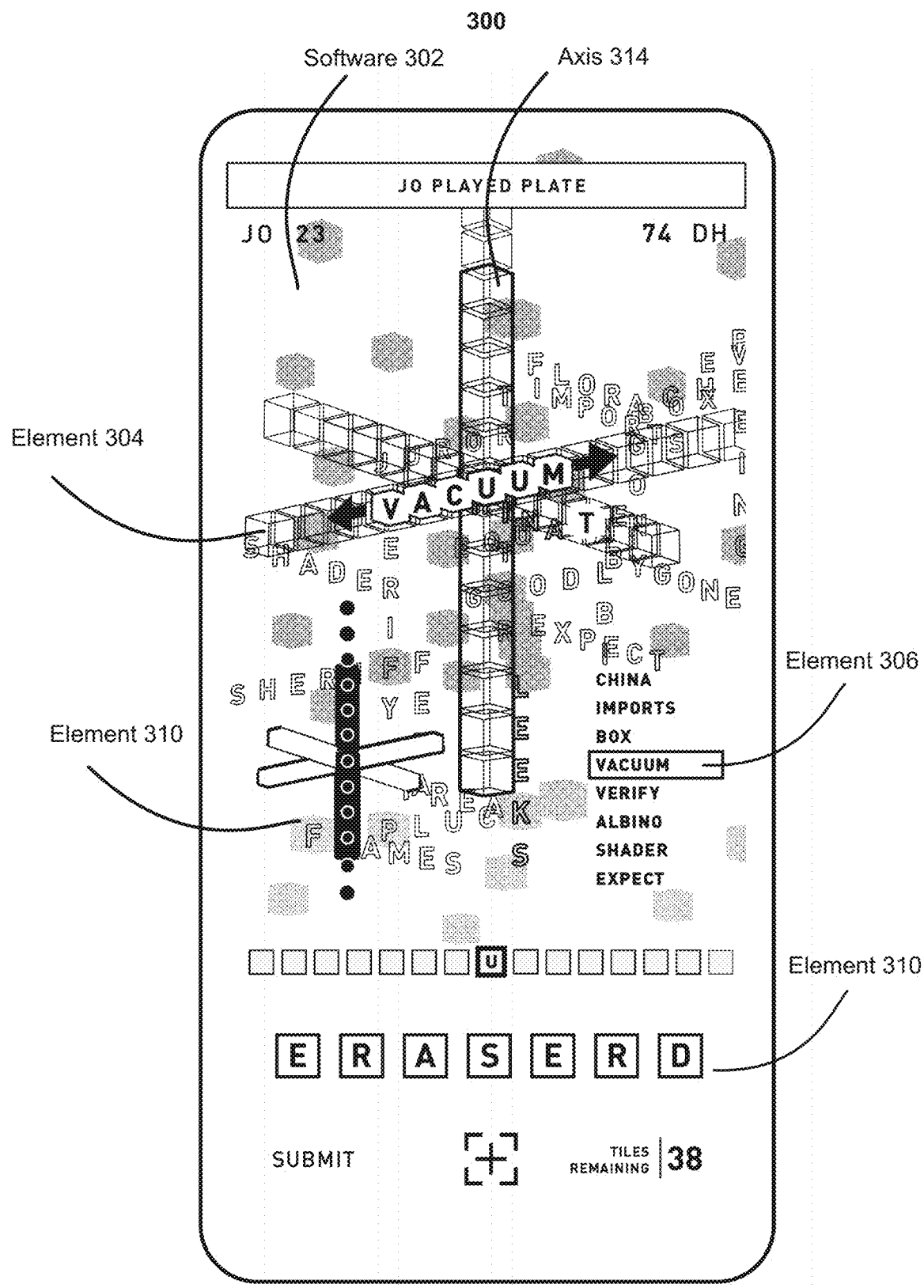
FIG. 3A illustrates a diagram of a software application with complex visual elements.
Figure 3B:
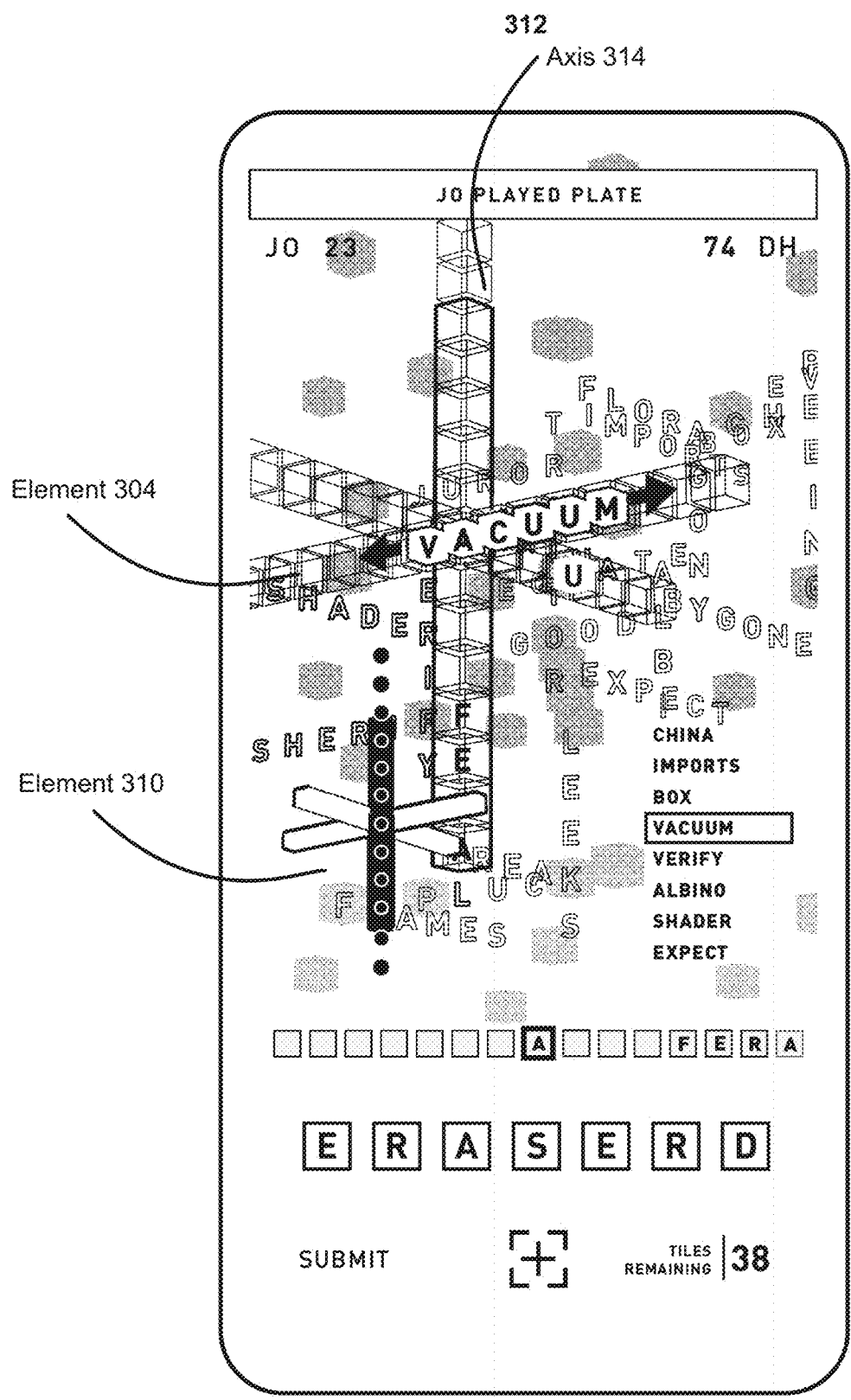
FIG. 3B illustrates a diagram of a user input executed on the software application with complex visual elements.

FIG. 3A illustrates a diagram 300 of a software 302 (e.g., a software application) with complex visual elements. FIG. 3B illustrates a diagram 312 of a user input executed on the software application with complex visual elements.

Software 302 is a volumetric game of Scrabble™. The term "volumetric" indicates that the game is played on a cubic structure (e.g., 15 letter cubes by 15 letter cubes by 15 letter cubes in which there are 3375 potential letter cubes for use in word plays. Each letter in the cube has a unique position (e.g., (X,Y,Z) in an XYZ-plane). Due to the amount and complexity of visuals in software 302, if the interface requires a user to select each block individually, the user experience would be poor. For example, the user would likely select a block that he/she did not intend to select, and may waste time in an attempt to perform basic game functions. Because a user cannot simply select, with high accuracy, a random block with a traditional point-and-select approach, the first aspect of the present disclosure is proposed, namely, a zoned user interface.

Prior to describing the zoned user interface, consider the following elements in software 302: (1) element 304 presents a horizontal array of blocks that include the term "vacuum," (2) element 306 includes a list of terms in the cubic structure, (3) element 308 includes letters that the user has to enter in the cubic structure, and (4) element 310 is a navigational proxy that enables the user to change an axis of element 304. For example, in FIG. 3A, the letter in the word "vacuum" along axis 314 is "u." Suppose that the user shifts his/her finger on element 310 upward, the play position changes such that the letter in the word "vacuum" along axis 314 becomes "a." This is shown in FIG. 3B. By using element 310 to adjust the axis associated with element 304, the user has more control as compared to selecting and dragging the term "vacuum." A dragging command may be incomprehensible to software 302, which would not know whether element 304 is to be dragged inward, upward, downward, etc., and to what degree.

Figure 4:
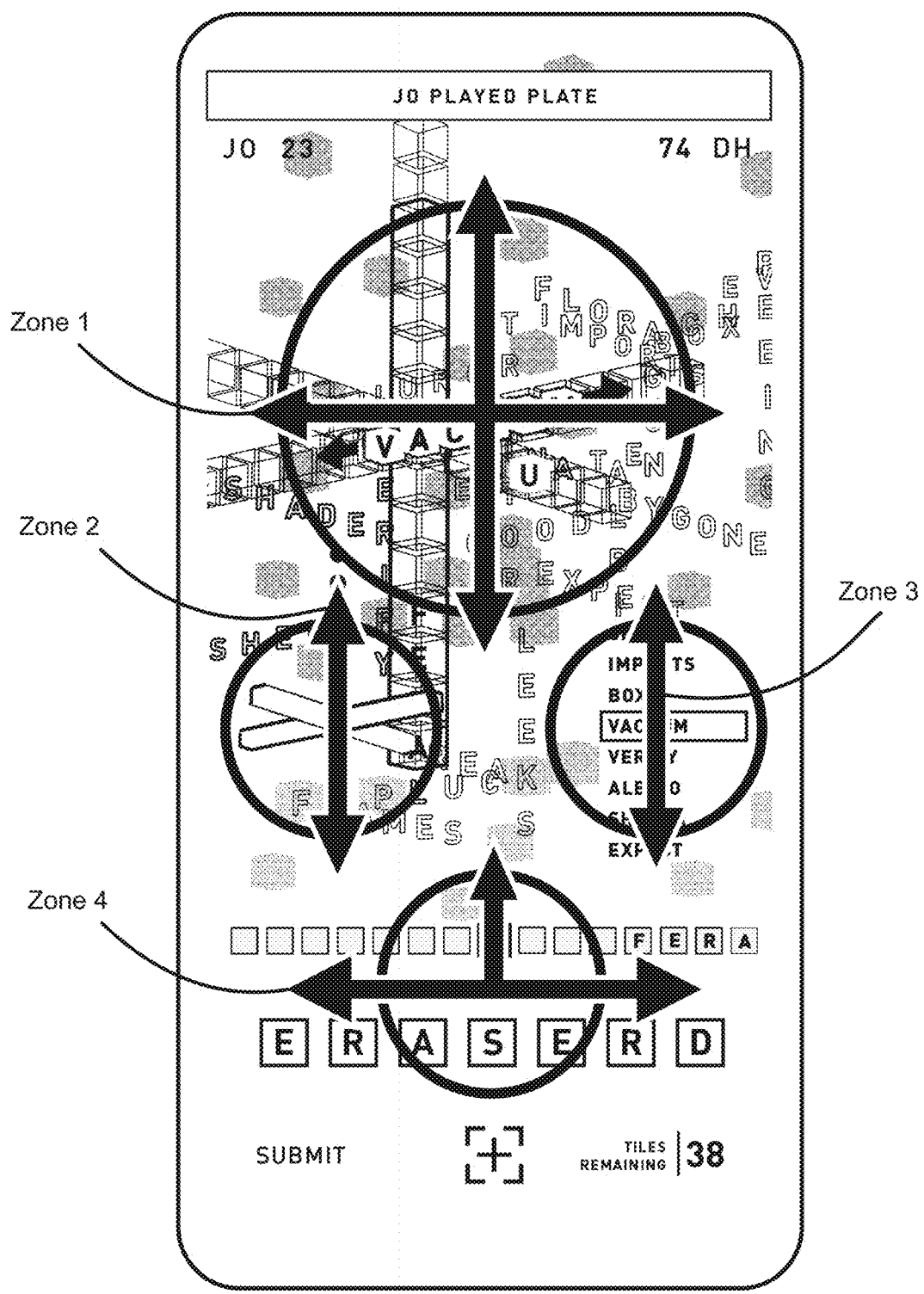
FIG. 4 illustrates a diagram of an exemplary zone user interface.

FIG. 4 illustrates a diagram 400 of an exemplary zone user interface generated by XR UI module 101. The zones include: primary zone 1, zone 2, zone 3, and zone 4. In a traditional user interface, the user simply interacts with primary zone 1 by selecting individual blocks in the cubic structure and performing rotations, scaling functions, etc. In the zone user interface, such functionality that would traditionally be performed on primary zone 1 is divided amongst zones 2, 3, and 4. As given in the previous example of FIGS. 3A and 3B, a user may interact with element 310 to change the axis associated with element 304. This is made possible by deferring the axis picking functionality to zone 2. Similarly, other actions such as word selection/navigation is deferred to zone 3, letter input is deferred to zone 4, etc. Depending on the software being executed, the functionality offered in each zone may change based on user interaction (will be discussed in the description of FIG. 9A-9C). Furthermore, although the arrows shown in each zone show how a user may interact with each zone, the manner of interaction may change based on the functionality. For example, zone 2 includes up and down arrows that suggest that the user may push up/down in that zone to select an axis.

Although only four zones are shown, one skilled in the art can appreciate that the amount of zones may increase or decrease depending on the software being executed. In a preferable aspect, four zones allows for a user to interact with the user interface almost instinctively (e.g., without looking). This is because four zones allow for a symmetric placement (e.g., left, right, up, down) of functionality that is well interpreted by the human mind. Additional zones may increase the complexity of the user interface as the user has to be more accurate with where he/she is providing an input gesture and recall additional mappings between functionality and zones. For example, if ten zones are introduced, not only does the user need to be mindful of what each zone does, but also be aware of where each zone is placed.

In some cases, having too few zones on the user interface can prevent quick and efficient navigation as well because the user will need to perform more interactions (e.g., gestures, button presses, etc.) to adjust the functionality of a zone and then subsequently execute the functionality. Referring to FIG. 4, if zone 2 is eliminated, the user will need to either interact directly with primary zone 1 (which poses the issues described previously), or will need to reset the functionality of zone 3 (e.g., to axis picking) and subsequently execute the functionality.

Figure 5:
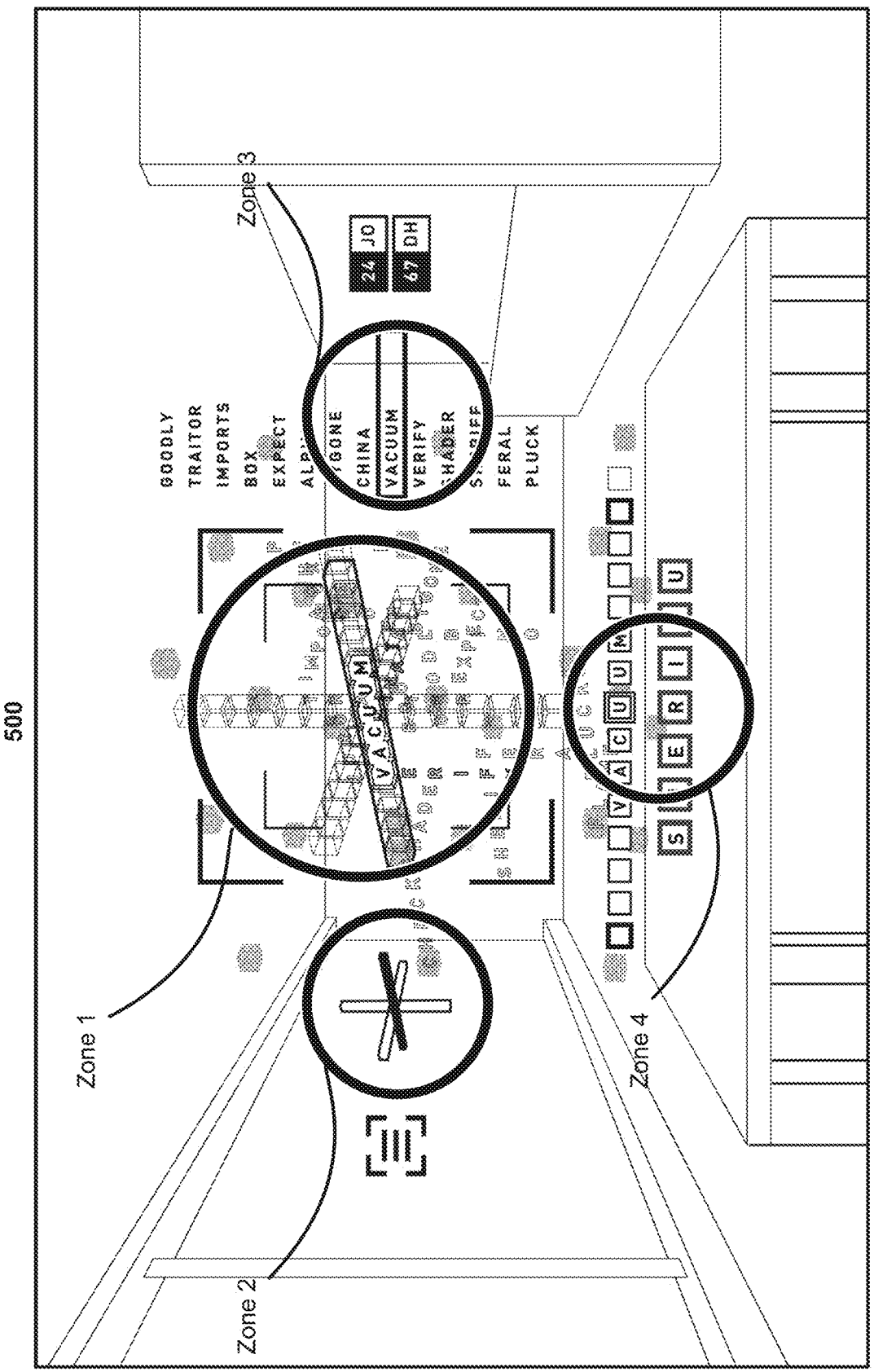
FIG. 5 illustrates an the software application of FIG. 3A executed in an extended reality setting.

FIG. 5 illustrates an the software application of FIG. 3A executed in an extended reality setting using XR UI module 101. Up until now, the description of software 302 has been from the perspective of a 2D display (e.g., display 204 of computing device 200). In FIG. 5, the user interface of the volumetric game is shifted into a 3D setting. Zones 1, 2, 3, and 4 are carried over from FIG. 4. In the 3D environment, visual depth is added to the cubic structure. It should be noted that although the user will understand that the cubic structure in FIG. 4 is a volume which can be rotated to achieve different views, in FIG. 5, the user can see the 3D attributes of the cubic structure. This is enabled by the dual visual output generated on display 102, which gives the illusion of depth. It is in this 3D format where the motivation for the zone user interface is more apparent because the difficulty of selecting objects/elements at varying depths increases. The performance of the zone user interface described in FIG. 4 relieves this difficulty because, as mentioned before, the user no longer performs a variety of functions that poorly translate when depth is introduced, all in primary zone 1. It should be noted that in the XR interface of the present application, all graphic elements such as characters, words, lines, shapes, etc., are independent objects in space. Conventional XR interfaces may simply display a singular object (e.g., a screen) that is floating in space, in which case the elements shown on the screen are part of the same object. In contrast, the icons, lists, graphics, etc., shown in the present application float in space, are organized by arrangements, justification of type, and careful positioning. Each object has its own position in the x,y,z space.

Figure 6:
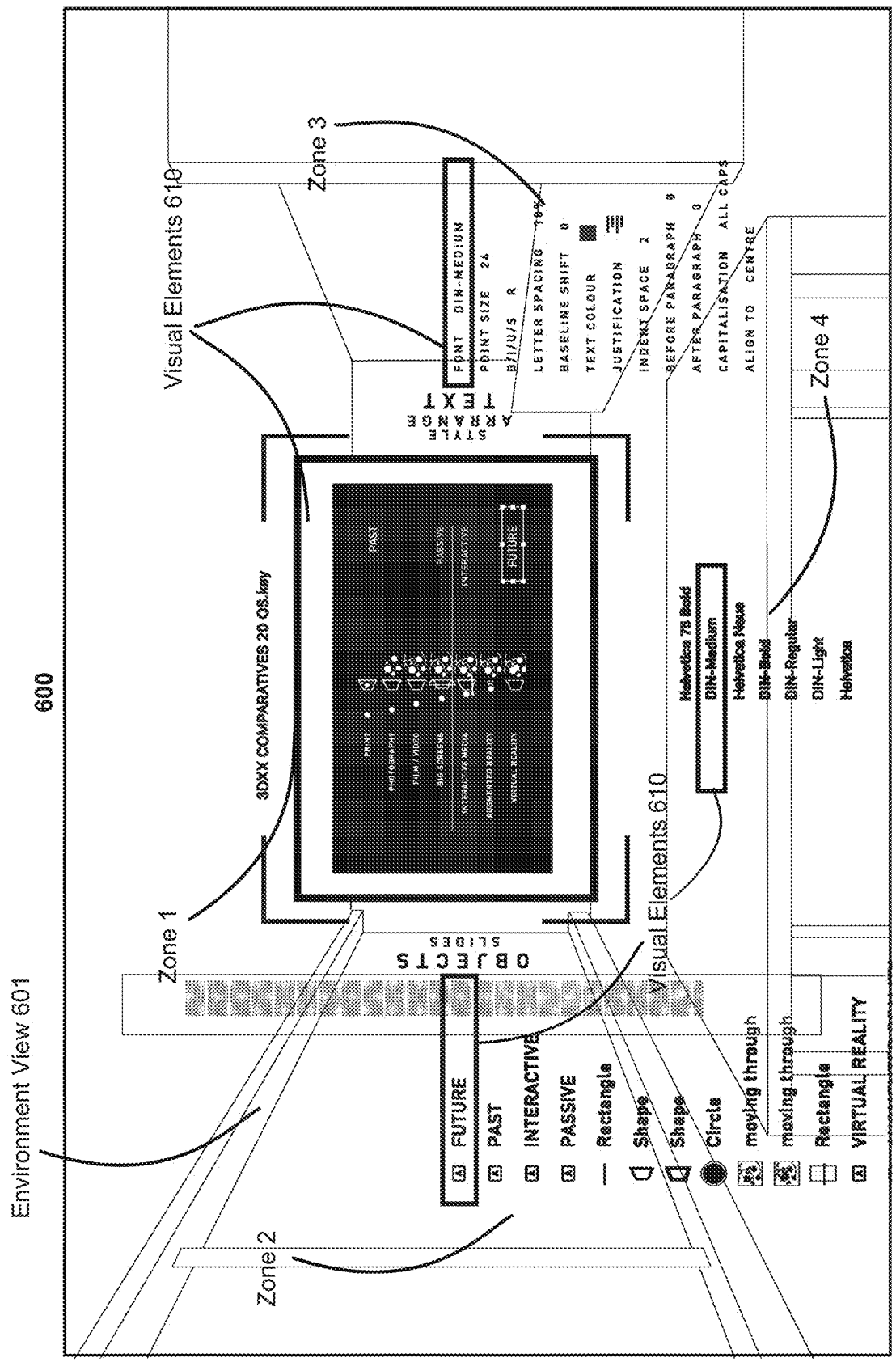
FIG. 6 illustrates a diagram of an exemplary zone user interface employed in an extended reality setting.

FIG. 6 illustrates a diagram of an exemplary zone user interface employed in an extended reality setting using the XR UI module 101. It should be noted that the zone user interface is applicable to various software applications. For example, in FIG. 6, the user is interacting with a different application (e.g., a slide editor such as Keynote™). Primary zone 1 depicts the focal point of the application (e.g., the slide currently being edited). In particular, primary zone 1 depicts the main image being edited/viewed. For example, in the three-dimensional word game, the cube is located in the primary zone. A user may interact with the element in primary zone (e.g., rotate the element to achieve different views). Zone 2 includes functionality such as a selector for various objects in the slide. For example, the user can scroll through the list of objects shown in zone 2, select an object, and that particular object will be selected in primary zone 1 (e.g., the text "Future" is selected by the user, which as a response, is highlighted in primary zone 1). Zone 3 includes functionality for editing the selected object in zone 2. For example, the user may scroll through the list of editable features and select "font," to adjust the font of the text "Future." Zone 4 includes functionality for editing the selected editable feature in zone 3. For example, zone 4 includes a list of selectable fonts. Visual elements 610 each show the current selection made by the user in each zone.

Figure 7:
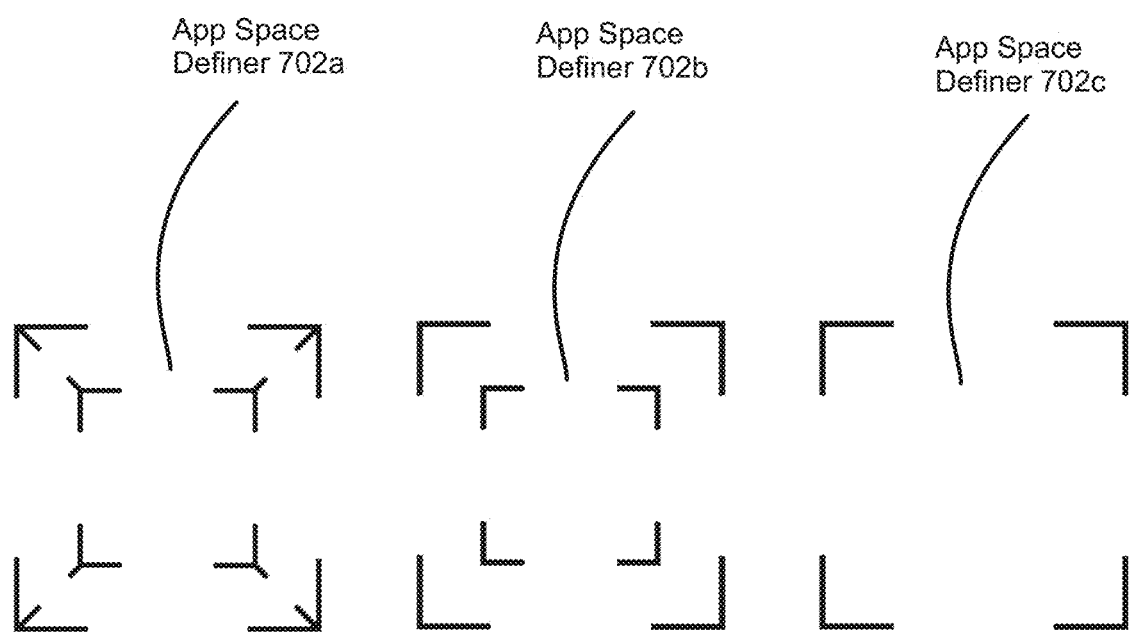
FIG. 7 illustrates variations of an application space definer used in the exemplary user interface of the present disclosure.

FIG. 7 illustrates variations of an application space definer (ASD) generated by the XR UI module 101. Each primary zone is bound by an application space definer. FIG. 7 depicts examples such as app space definer 702a and app space definer 702b, which both establish a depth of the application space for 3D visuals (e.g., the cubic structure in FIG. 5). App space definer 702c may be used for a 2D visual that does not have depth characteristics (e.g., the slide in FIG. 6). The height and width of the app space definer may change based on the visuals of the application being executed in the zone user interface. For example, in FIG. 12B and FIG. 12C, the app space definer has a different width because the objects being depicted have different dimensions.

In general, an ASD is a "loose" container of an application. The core elements are included within the space of the ASD, but relevant parts can extend beyond. An example is shown in FIG. 5, in which when zooming into a desired area that surrounds the selected word, the cubes that define the game cube are visible beyond the ASD. In the current world of windows (that contain applications in two-dimensions) it is not possible to accommodate this extension beyond the edges of the window. But in fact, as in the case of FIG. 5, seeing the parts outside of the ASD is quite useful. In some aspects, the extended parts fade out over distance (e.g., 100 pixels) from the ASD so as to not form edges.

This particular array of three examples of the ASD is meant to show that there are various ways to graphically display the working area of an application or visual, although more variations may be contemplated. It is worth noting that the exact variation used can be considered to be part of the "brand" of the entity creating the application.

Figure 8:
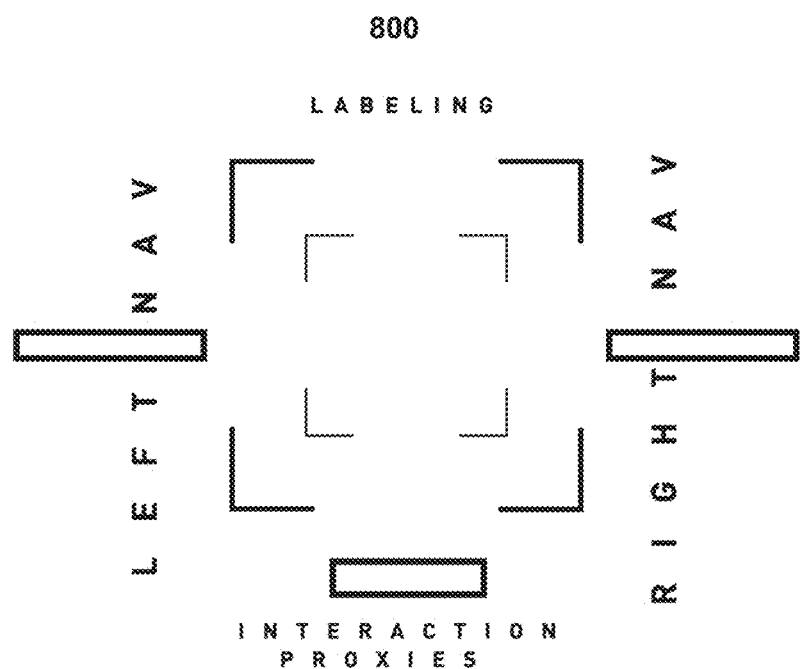
FIG. 8 illustrates navigation panels and interaction proxies used in the exemplary user interface of the present disclosure.
Figure 8:
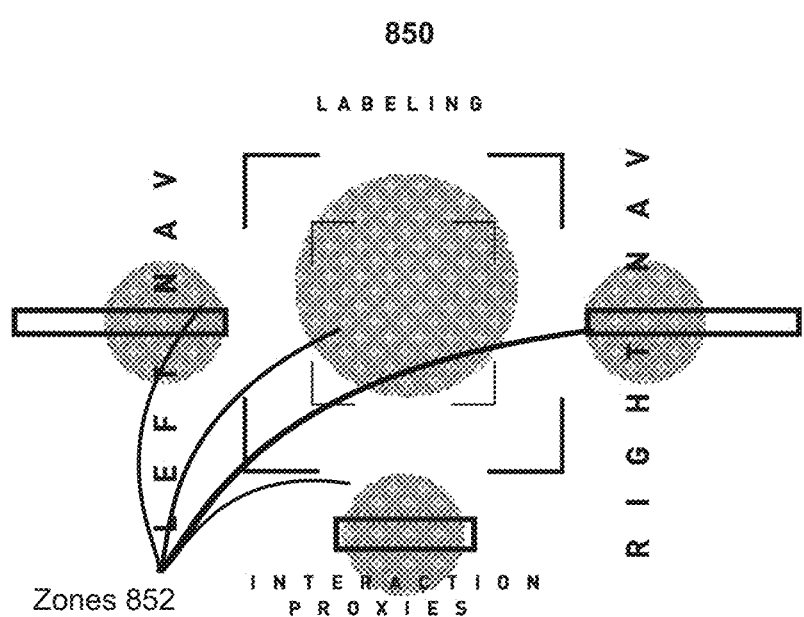

FIG. 8 illustrates navigation panels and interaction proxies generated by the XR UI module 101. The zone user interface 800 includes a left navigation zone, a primary zone, a right navigation zone, and interaction proxies. These zones are specifically located in this arrangement so as to be discernible without looking at the virtual interaction surface. Zone user interface 850 is an annotated version of zone user interface 800 and includes zones 852. In an exemplary aspect, zones 852 are not visually marked on the user interface. For example, the user's view will simply show zone user interface 800 (unless the user specifically requests to see where zones 852 are located). It should be noted that although each zone is shown as a circle, the area bound by each zone may be of any shape (e.g., a rectangle, an oval, etc.) and of any size (e.g., spanning an edge of the display to another edge) so long as the zones do not overlap.

As noted earlier, the zones represent the general spot where a gesture begins. As in where the "touch" is made. After the system identifies the zone, the user then moves up or down or left or right.

Figure 9A:
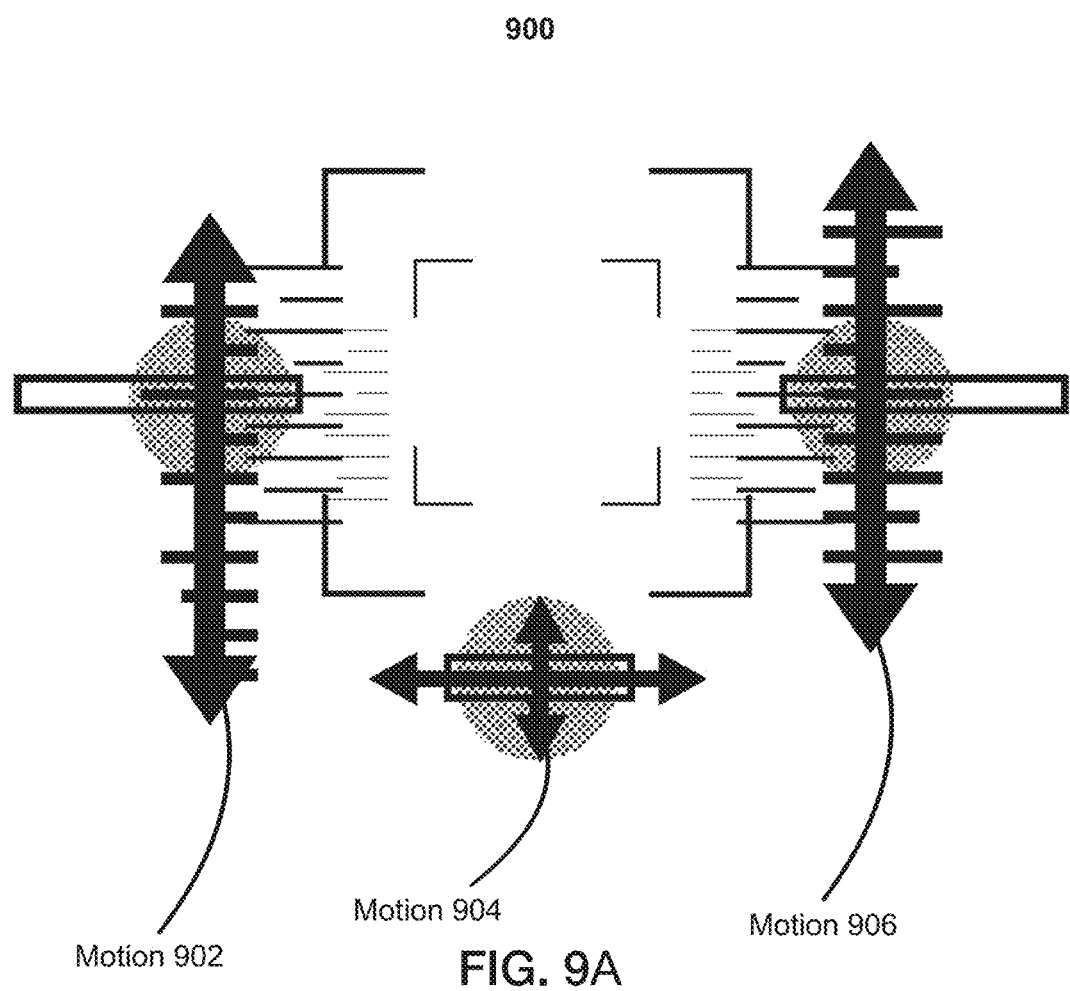
FIG. 9A-9E illustrate various gestures for navigating the exemplary user interface of the present disclosure.

FIG. 9A-9E illustrate example gestures for navigating the exemplary user interface generated by the XR UI module 101. To perform any of the motions shown in FIGS. 9A-9E, the user touches an area in a given zone (generally aiming for a center of that zone) and then moves directionally in a particular motion. In FIG. 9A, zone user interface 900 is depicted in which the user may execute a gesture with motion 902 (up/down) to navigate a list in the left navigation zone. The user may execute a gesture with motion 904 (left/right/up/down) to navigate a list in the interaction proxies zone. The user may execute a gesture with motion 906 (up/down) to navigate a list in the right navigation zone. In some aspects, a gesture may involve moving a finger in a certain motion. This motion may be captured by a touch-sensitive display (e.g., display 204), or may be captured by a camera (e.g., in sensors 104 and/or sensors 202). In particular, the capture may be split into two parts: a touch or point at a particular zone, and then a subsequent motion (e.g., motion 906).

Figure 9B:
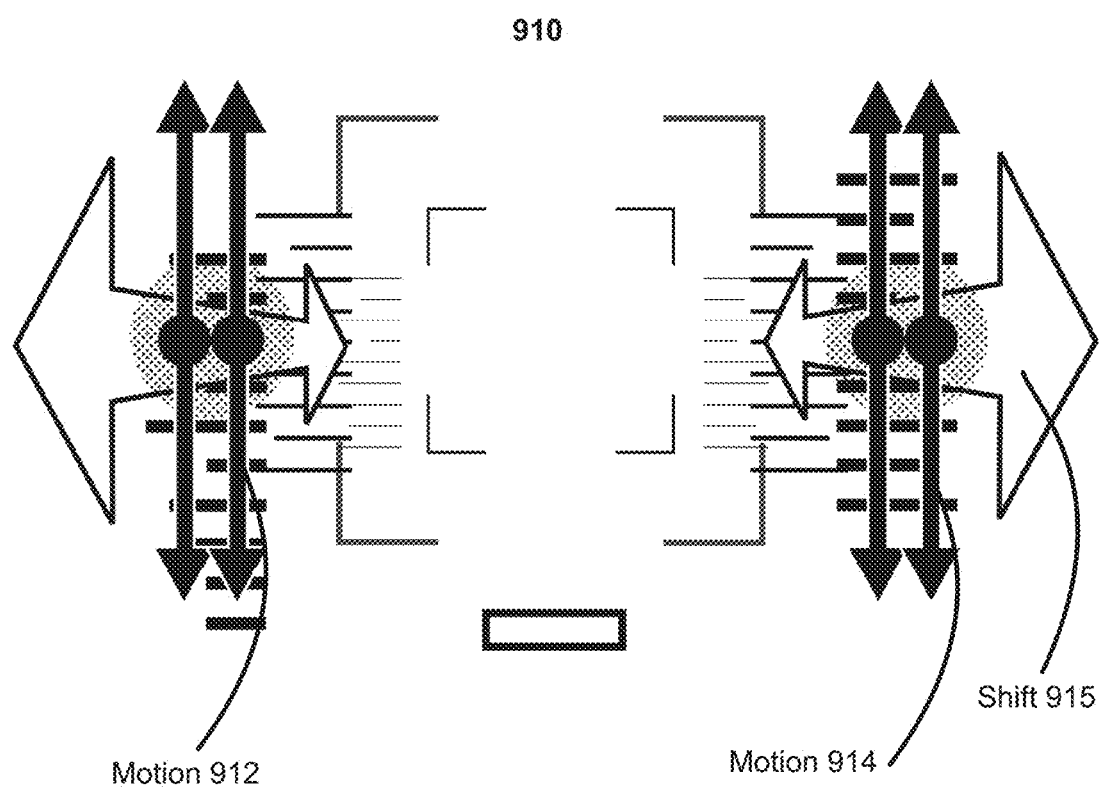

As mentioned previously, in an extended reality space, there may be a depth property of the zone user interface. In FIG. 9B, zone user interface 910 shows motions 912 and 914 for scrolling across different depth layers. For example, left navigation zone may have a list that spans multiple columns. As shown in FIG. 9B, each column is spaced at a different depth (the further the column is, the thinner its lines are in FIG. 9B). In order to bring a column in the back to the forefront, the user may execute a gesture of motion 912 (specifically motioning downward). In some aspects, the gesture may involve moving two fingers in motion 912 in zone 2 or motion 914 in zone 3. Based on this gesture, the columns may be traversed along the depth axis as shown by shift 915 (also applicable to columns in zone 2). The reasoning behind this motion is that two fingers swiped downward is like "pulling" an array closer to the user and two fingers swiped upward is like "pushing" the array away. In some aspects, the arrays may be arranged in a carousel such that pushing upward/downward in one direction restarts the display of the first array after all arrays have been navigated through the motion. This motion may also be captured by a touch-sensitive display (e.g., a touch screen), or may be captured by a camera.

Figure 9C:
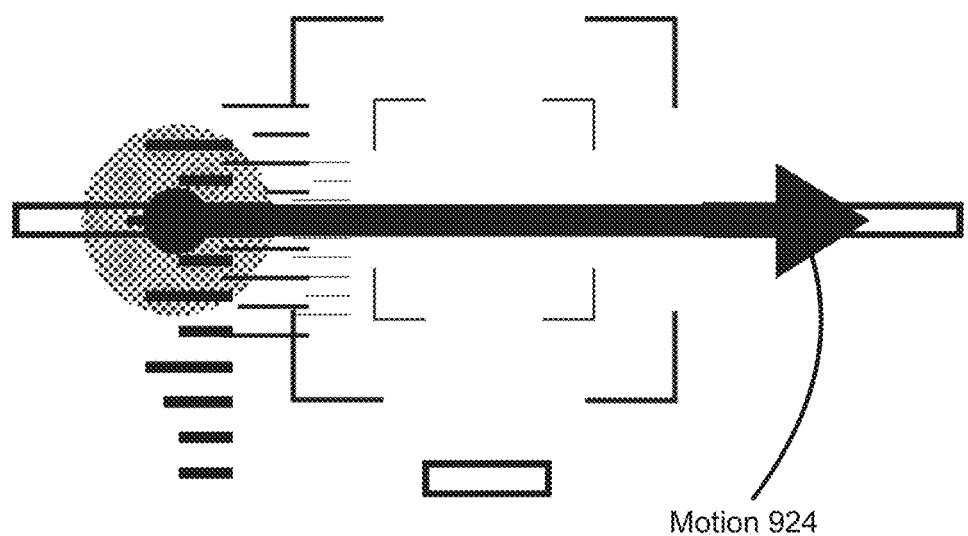
Figure 9D:
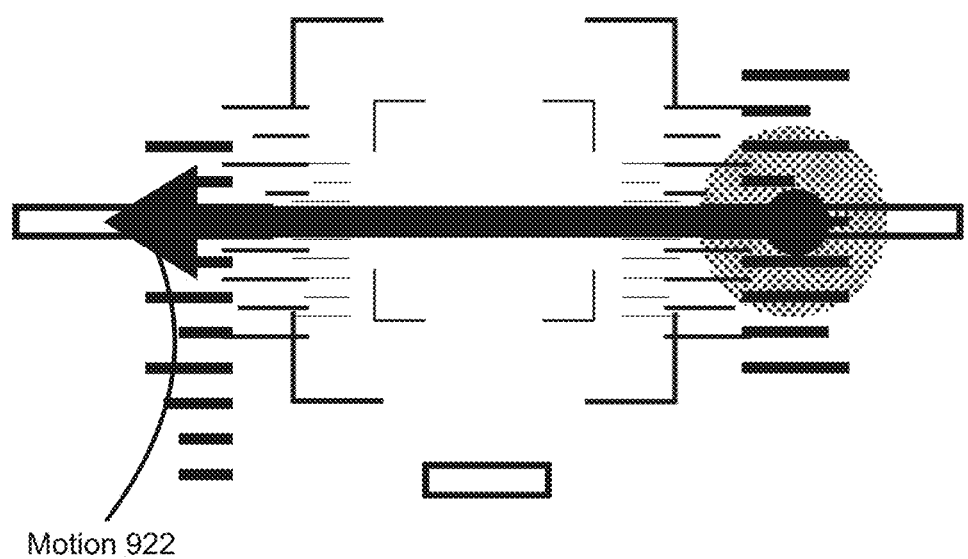

In FIGS. 9C and 9D, zone user interfaces 920 and 921 show motions 924 and 922, respectively, for scrolling across different applications and application histories. For example, by executing a gesture associated with motion 922, the user can go "back" to a previous menu of the application or close an application. By executing a gesture associated with motion 924, the user can go "forward" to another menu of the application. The user may also switch between applications using said motions. In particular, motion 922 involves performing a gesture in which the finger of the user horizontally spans from the right navigation zone to the left navigation zone. Before an app is opened, users can make successive motions left to right (motion 924) allowing a hierarchical selection of arrays to open an application, and open a desired file. The user may make a "mental map" where left/right motions across zones 2 and 3 (represented here by motions 924 and 922) are reserved for traversing to and across the hierarchical layout of applications and the finder.

In an exemplary aspect, the capture of the motion on the touch screen and/or by a camera is broken into two parts. In the first part, the user "touches" a location on a particular zone. In the second part, the user swipes in a particular direction. For example, when performing motion 924, the user selects a location in zone 2 and swipes towards the right.

Figure 9E:
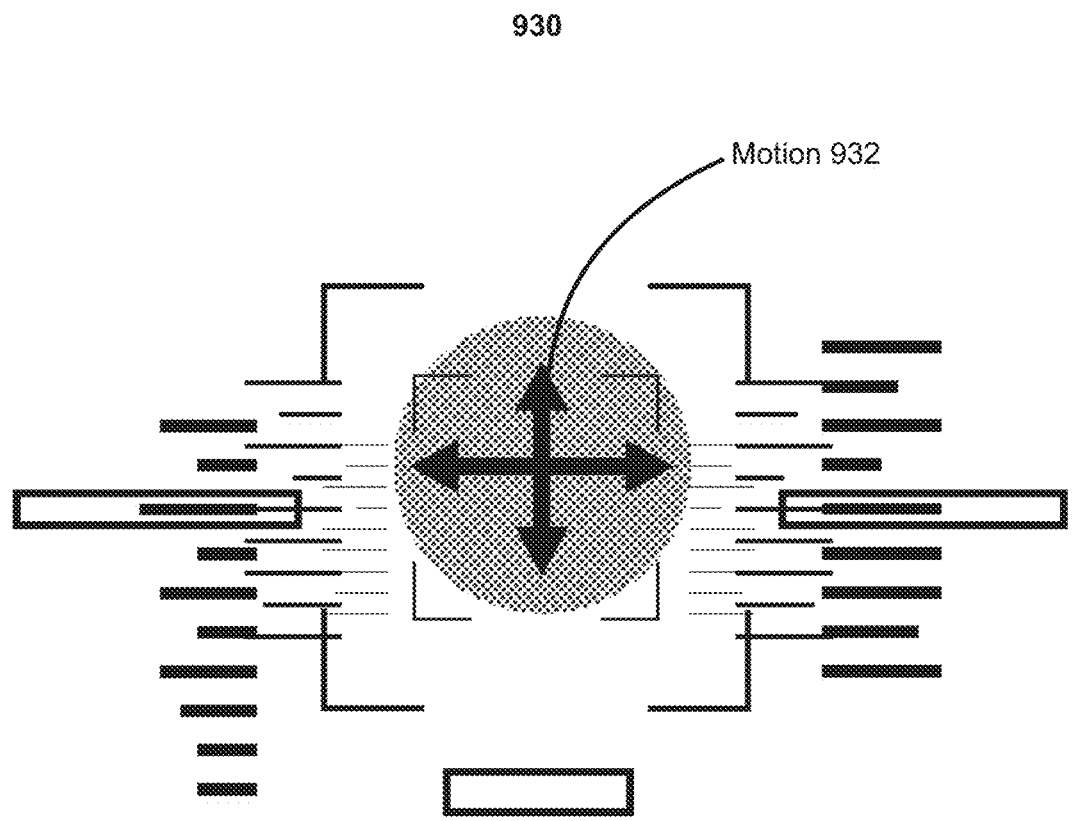

FIG. 9E illustrates zone user interface 930 in which motion 932 is executed in primary zone 1. Motion 932 allows a user to, for example, rotate/enlarge/shrink an element (e.g., the main focal element) in primary zone 1.

FIGS. 10A-10F illustrate isometric views of navigating an operating system using the exemplary user interface of the XR UI module 101. FIGS. 11A-11E illustrate user perspective views corresponding to the isometric views shown in FIGS. 10A-10E.

Figure 10A:
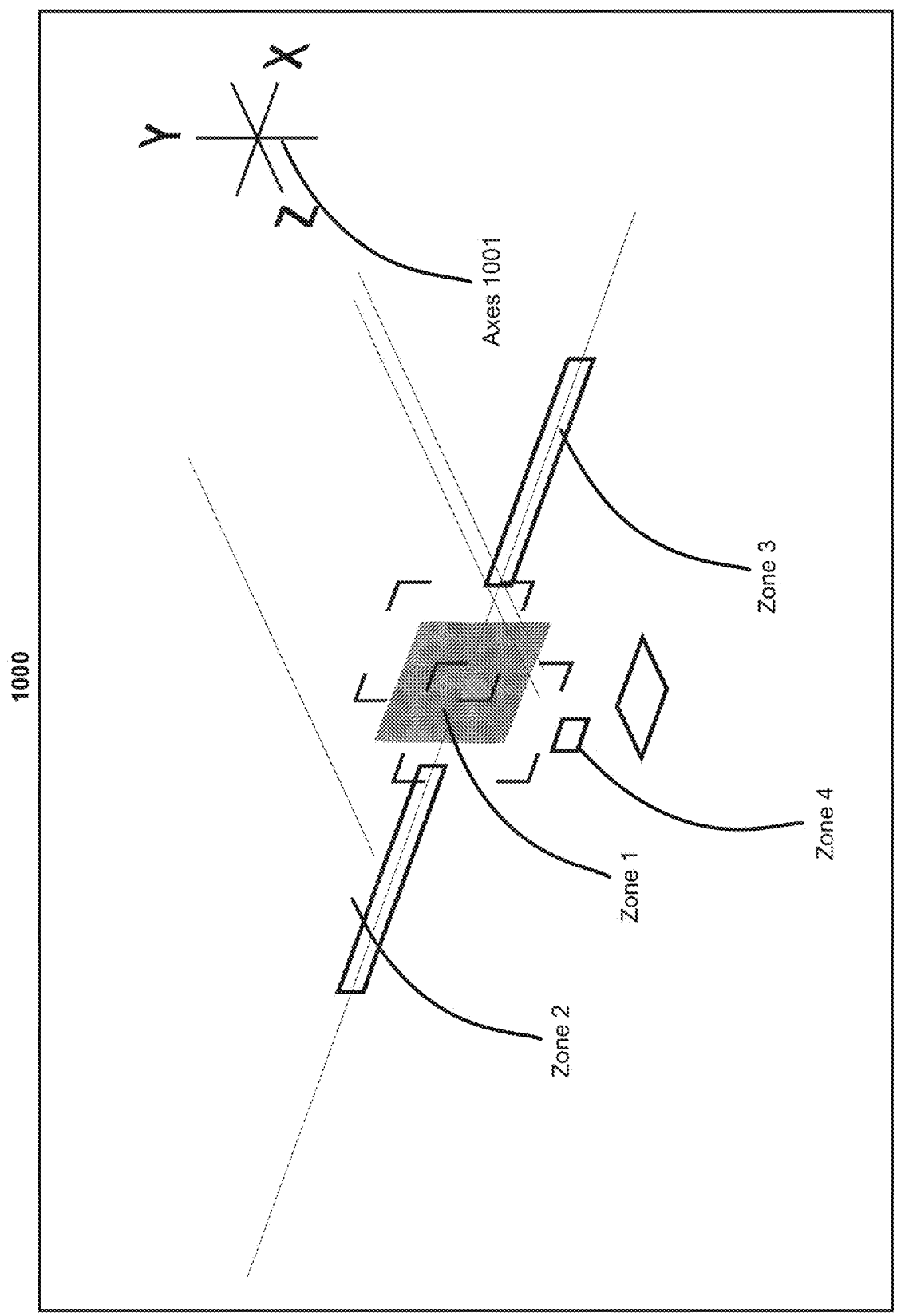
FIGS. 10A-10F illustrate isometric views of navigating an operating system using the exemplary user interface of the present disclosure.
Figure 11A:
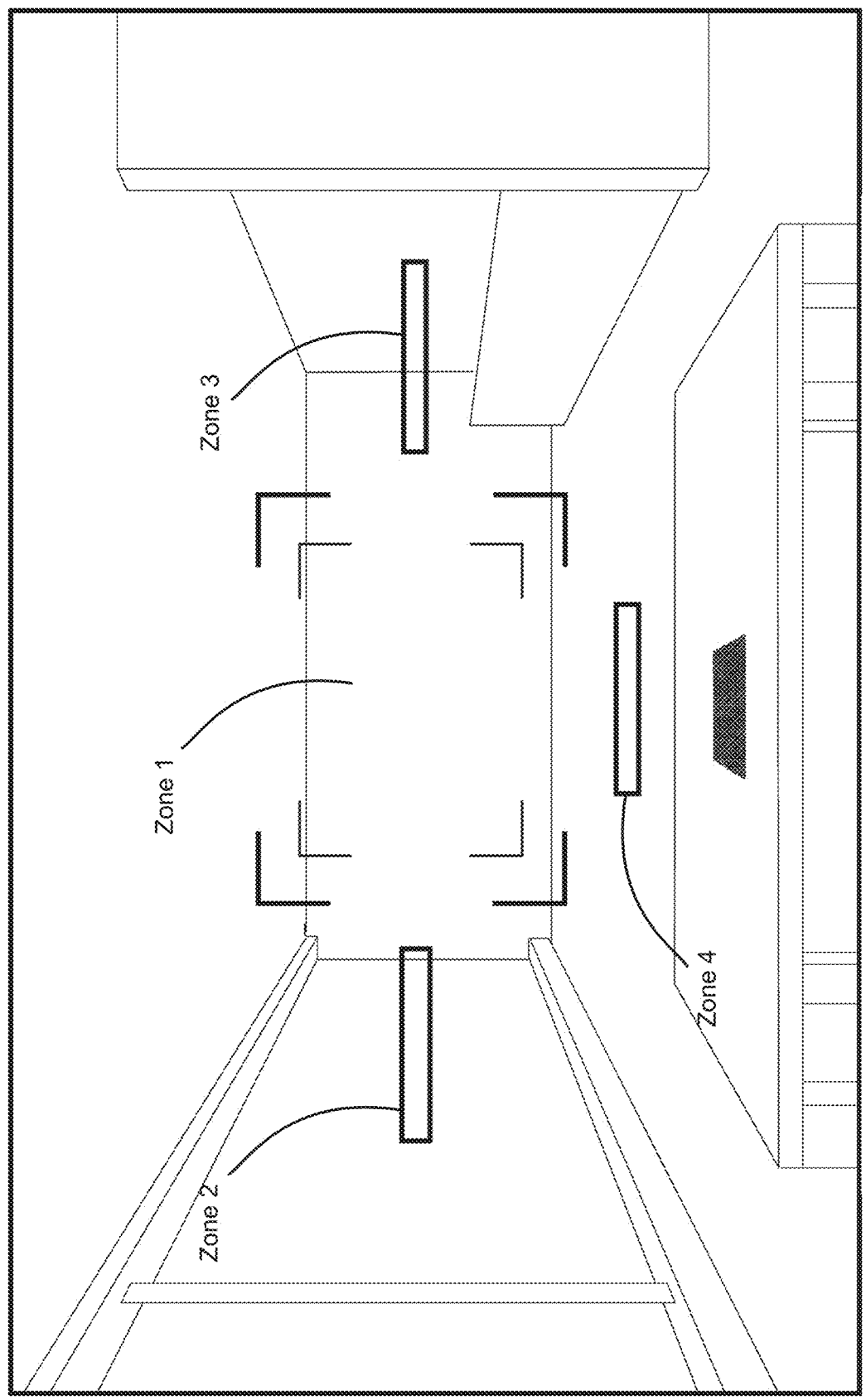
FIGS. 11A-11E illustrate user perspective views corresponding to the isometric views shown in FIGS. 10A-10E.

FIG. 10A depicts the isometric structure of zone user interface 1000, which includes zones 1, 2, 3, and 4. Axes 1001 depicts an XYZ-coordinate system in which the X-axis corresponds to left/right, the Y-axis corresponds to up/down, and the Z-axis corresponds to depth as in in/out. FIG. 11A depicts the user perspective of zone user interface 1000, which includes zones 1, 2, 3, and 4.

Figure 10B:
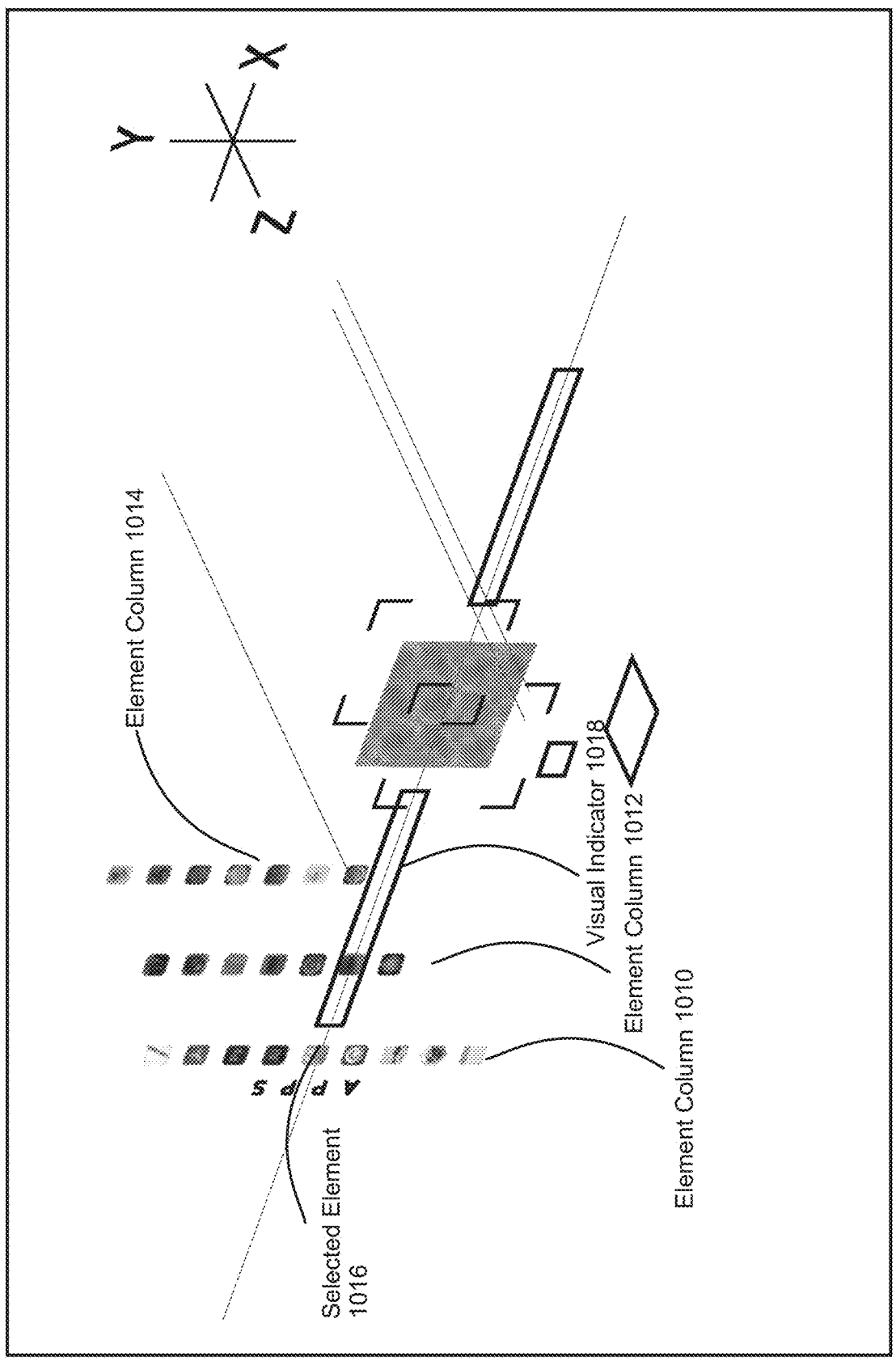
Figure 11B:
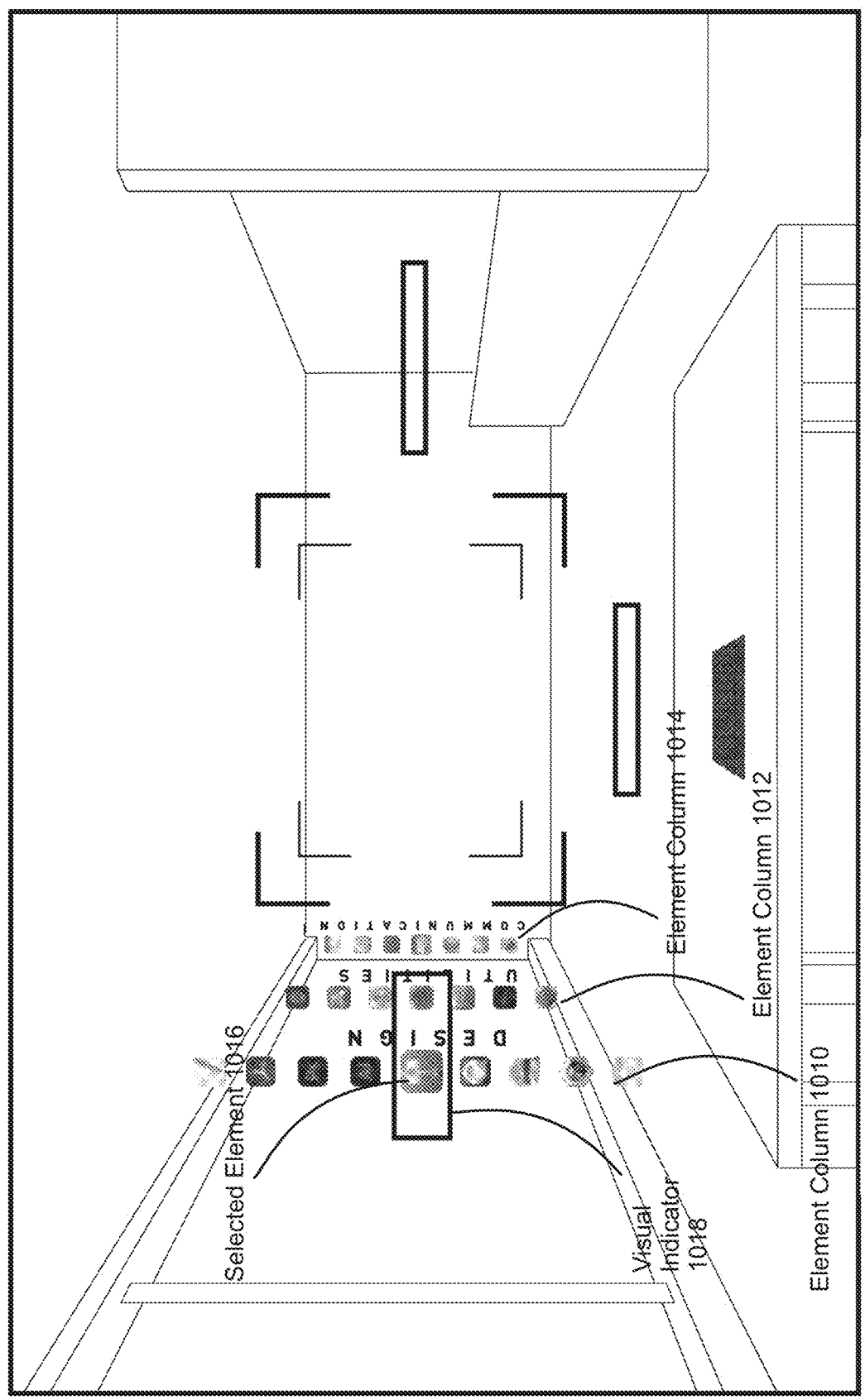

FIG. 10B depicts the isometric structure of zone user interface 1000 as the user navigates through a start up menu of an operating system. For example, the user might swipe left to right (from zone 2 to zone 3), and zone user interface 1000 presents a plurality of software applications to select from. This list is provided in zone 2 and is divided into multiple columns, namely, element column 1010, element column 1012, and element column 1014. In some aspects, the columns may represent an organisation system in which each column holds a specific type of element (e.g., communications elements, utility elements, design elements, etc.). The user may select an application (e.g., a slider editor) by scrolling through element column 1010 until the desired application (i.e., selected element 1016) is placed in visual indicator 1018. Swiping left to right opens the selected application in visual indicator 1018. FIG. 11B depicts the user perspective of the list of applications and selected element 1016.

Figure 10C:
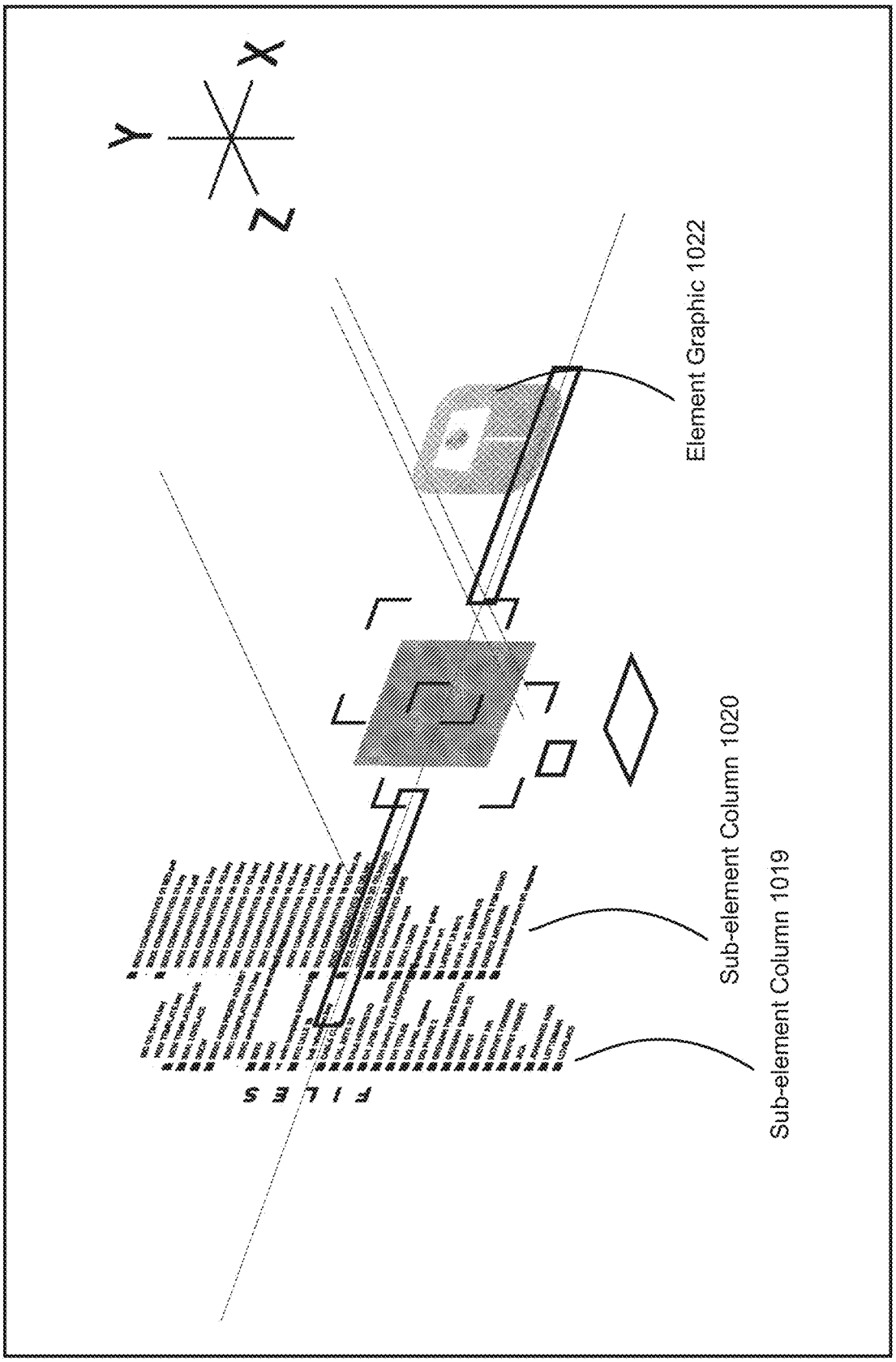

FIG. 10C depicts the isometric structure of zone user interface 1000 as the user navigates through menus of an application. Once an app is opened, FIG. 10C shows the hierarchical display of files relating to the application that has been opened. They may, as in this case, begin at the front of the depth axis array with project folders, and after placing desired job folder in the selection rectangle, the columns move forward (or are pulled forward using a two finger downward swipe), and the respective column of files is in place to navigate up/down to a desired file.

Figure 11C:
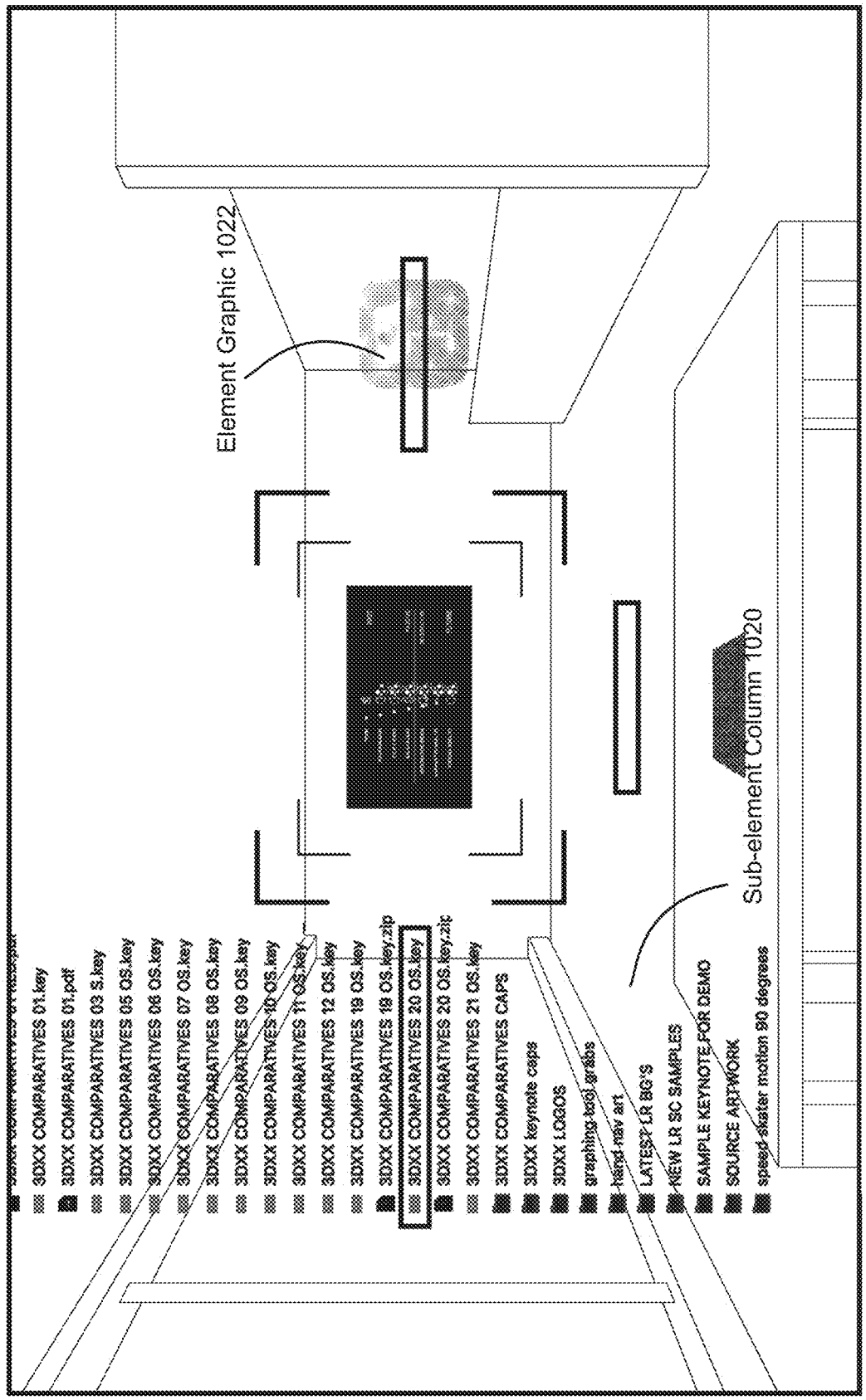

Suppose that the user launches the application associated with selected element 1016. To make the selection, in an exemplary aspect, the user touches zone 2 (e.g., with selected element 1016 in visual indicator 1018) and swipes to the right. In some aspects, a logo/icon associated with the launched application may be set as element graphic 1022. Element graphic 1022 is positioned in the background of zone 3. In an exemplary aspect, the first menu associated with the launched application is presented in zone 2. For example, the slide editor may request the user to select a file to launch. Again, zone 2 displays a list of files arranged in sub-element column 1019 and sub-element column 1020. FIG. 11C depicts the user perspective of the list of files and element graphic 1022.

Figure 10D:
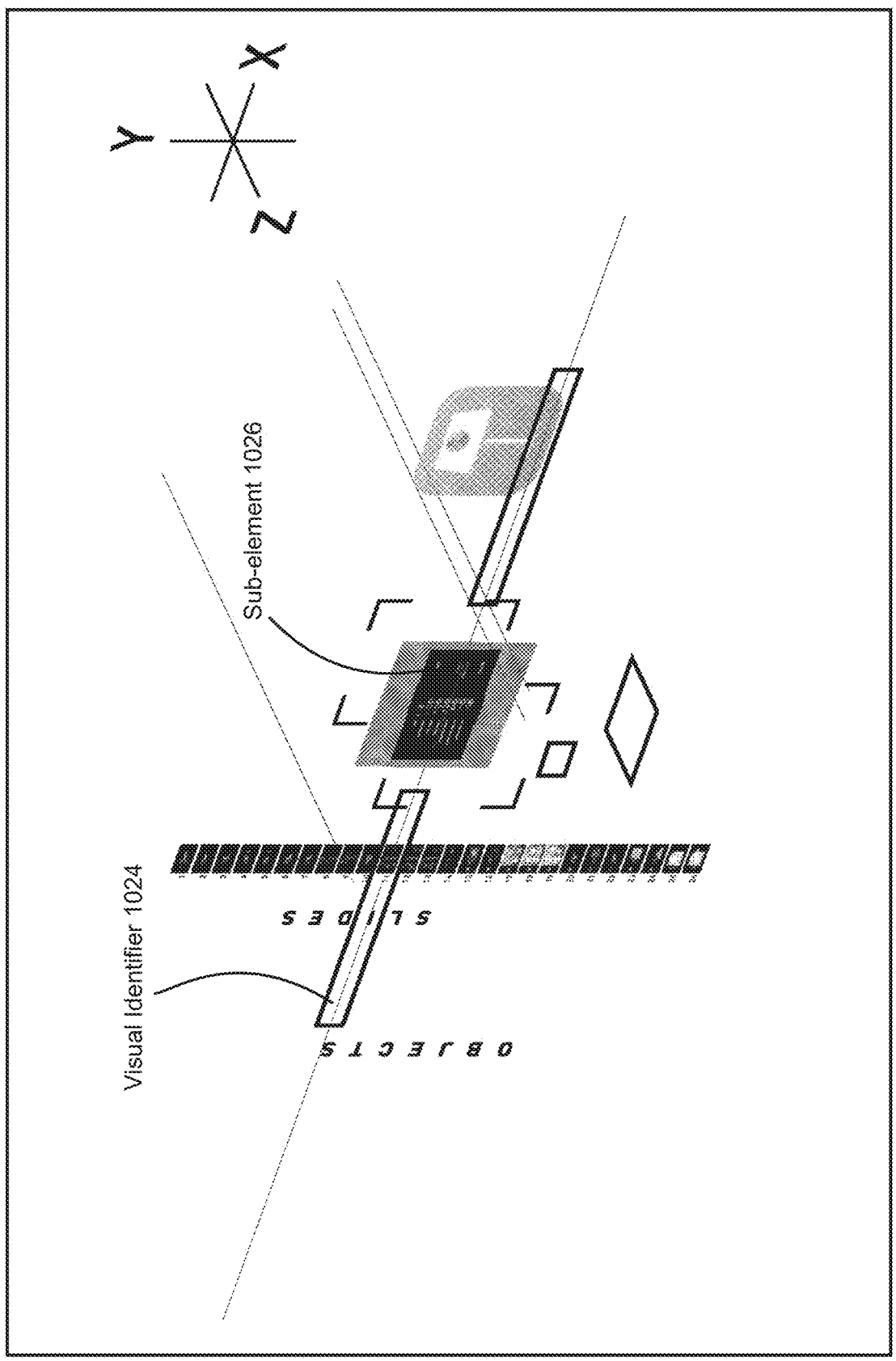
Figure 11D:
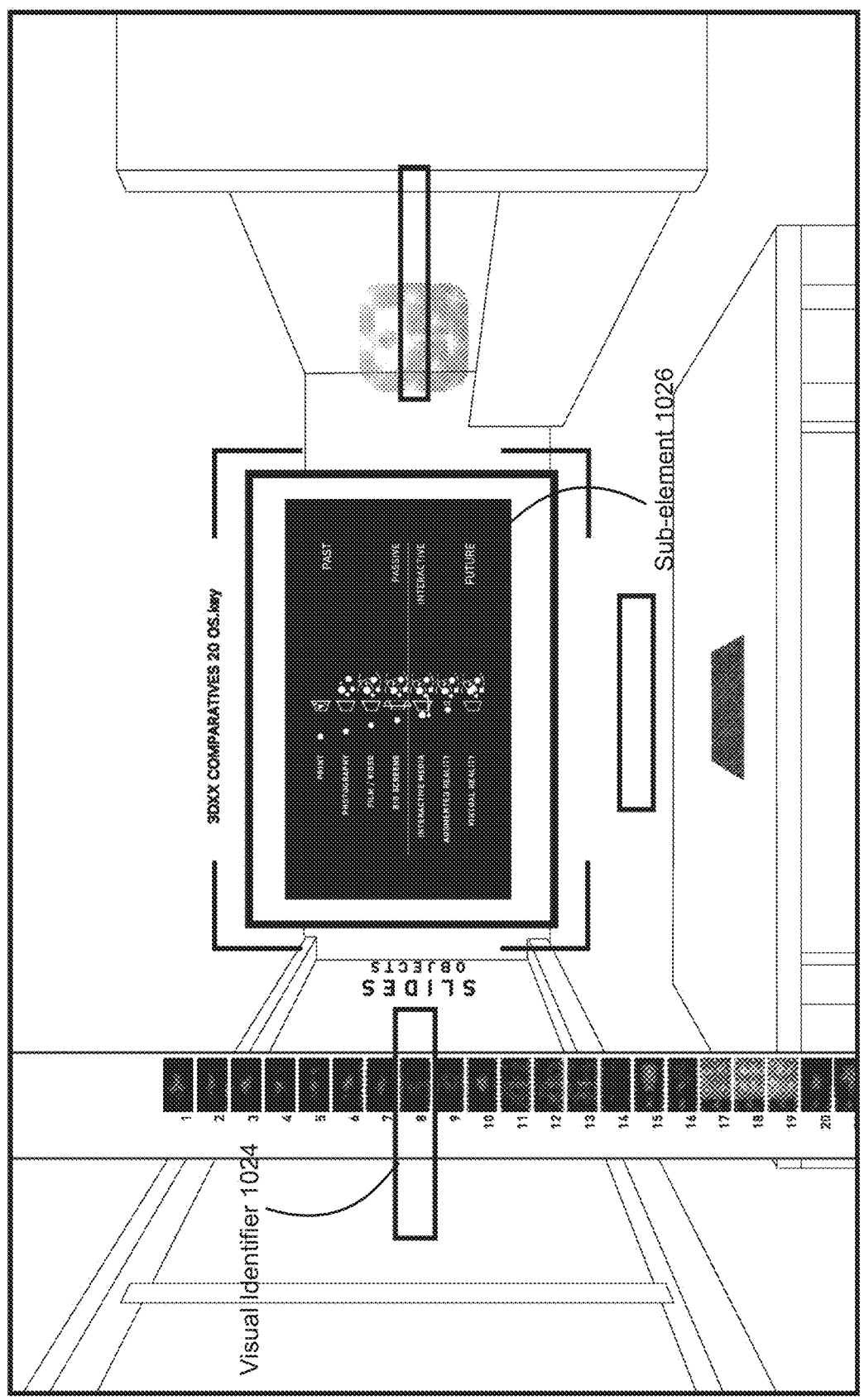

FIG. 10D depicts the isometric structure of zone user interface 1000 as the user makes selections in the application. Suppose that the user selects a file in the list of files shown in FIG. 10C. Zone user interface 1000 may change zone 2 to provide a list of contents in the file. Primary zone 1 may output on of the contents in the list. For example, a user may select one of the slides (i.e., sub-element 1026) in the selected file by scrolling through the list of contents until the desired file is highlighted by visual identifier 1024. The full view of sub-element 1026 may be displayed in primary zone 1. FIG. 11D depicts the user perspective of the list of contents and sub-element 1026. More specifically, FIG. 10D depicts a unique set of options specific to a slider editor, namely "objects" and "slides." It should be noted that other apps will have different options in zone 2. Once the user selects a slide to edit, the user will see the "objects" list of the specific elements in that slide in order of front to back. Pressing and holding on zone 2 in the "objects" column presents a selection of types of "objects" from which user chooses to create a new object.

Figure 10E:
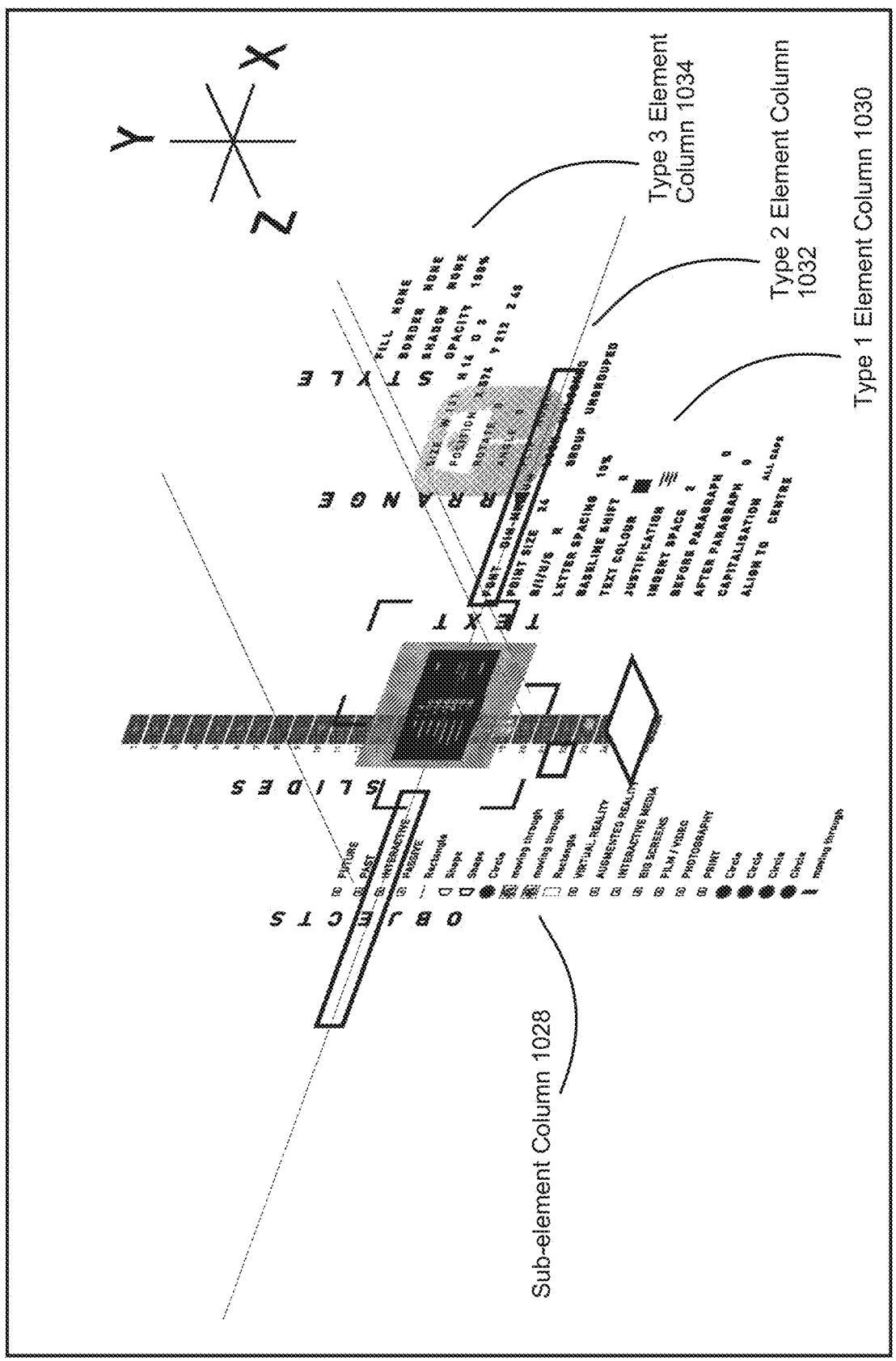
Figure 11E:
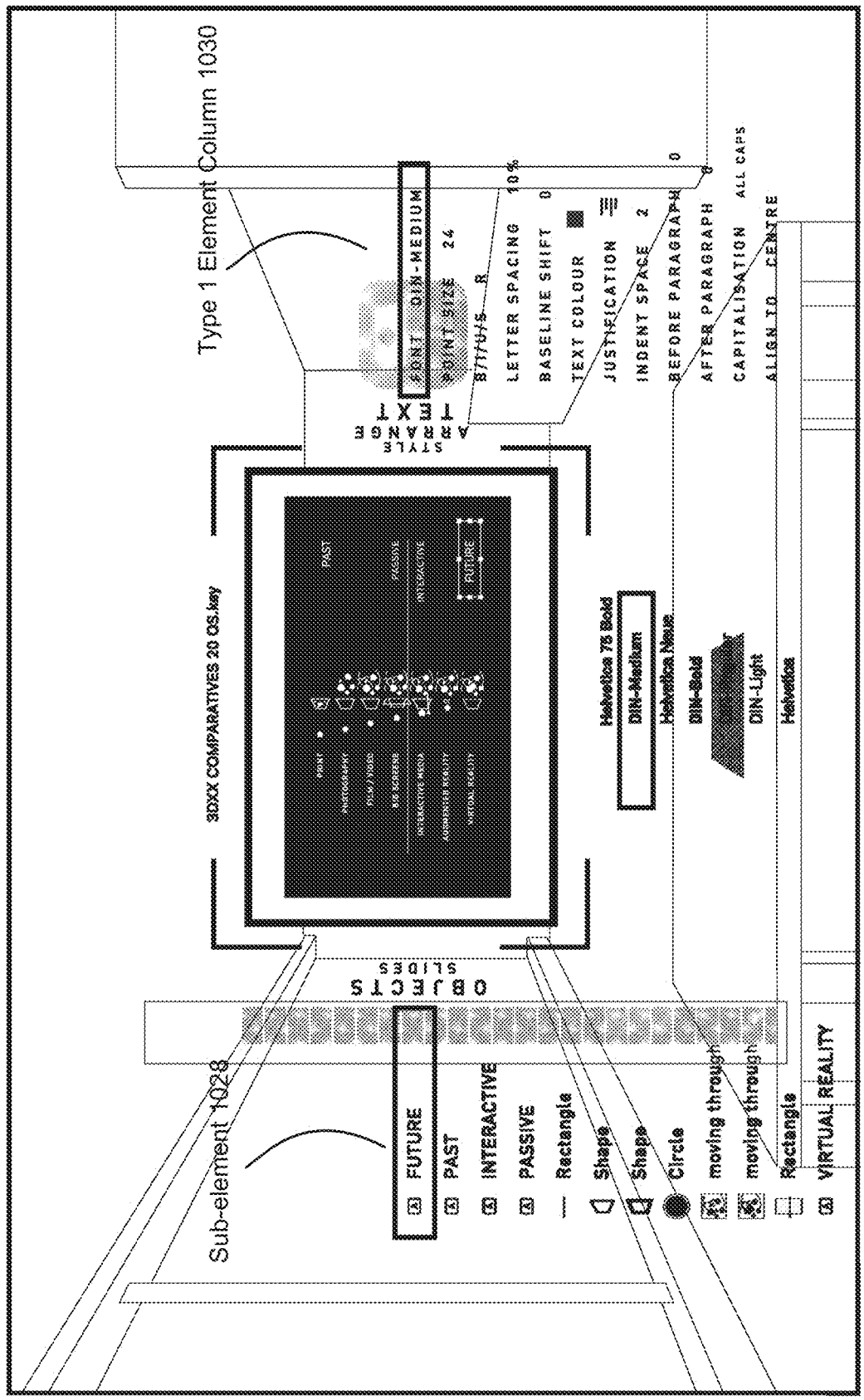

FIG. 10E depicts the isometric structure of zone user interface 1000 as the user makes further selections in the application. The example shown in FIG. 10E is similar to the example shown in FIG. 6, in which objects in primary zone 1 are selected using zone 2, the attribute of the object to edit is selected using zone 3, and the attribute is edited using zone 4. FIG. 10E further depicts the various columns associated with the attributes. For example, the object selection is organized in sub-element column 1028. The attribute types are organized as type 1 element column 1030 (associated with text), type 2 element column 1032 (associated with arrangement), and type 3 element column 1034 (associated with style). A user may toggle between each column in zone 3 using motion 914 shown in FIG. 9B. FIG. 11E depicts the user perspective of the isometric view in FIG. 10E. Like the left-side columns in zone 2, the right-side columns in zone 3 are specific to the slide editor. Other applications will have other options. The slider editor in the given example organizes object editing in 3 types: TEXT (for working with text), ARRANGE (for grouping, positioning, sizing, etc.), and STYLE (for addressing opacity, borders, etc.).

Figure 10F:
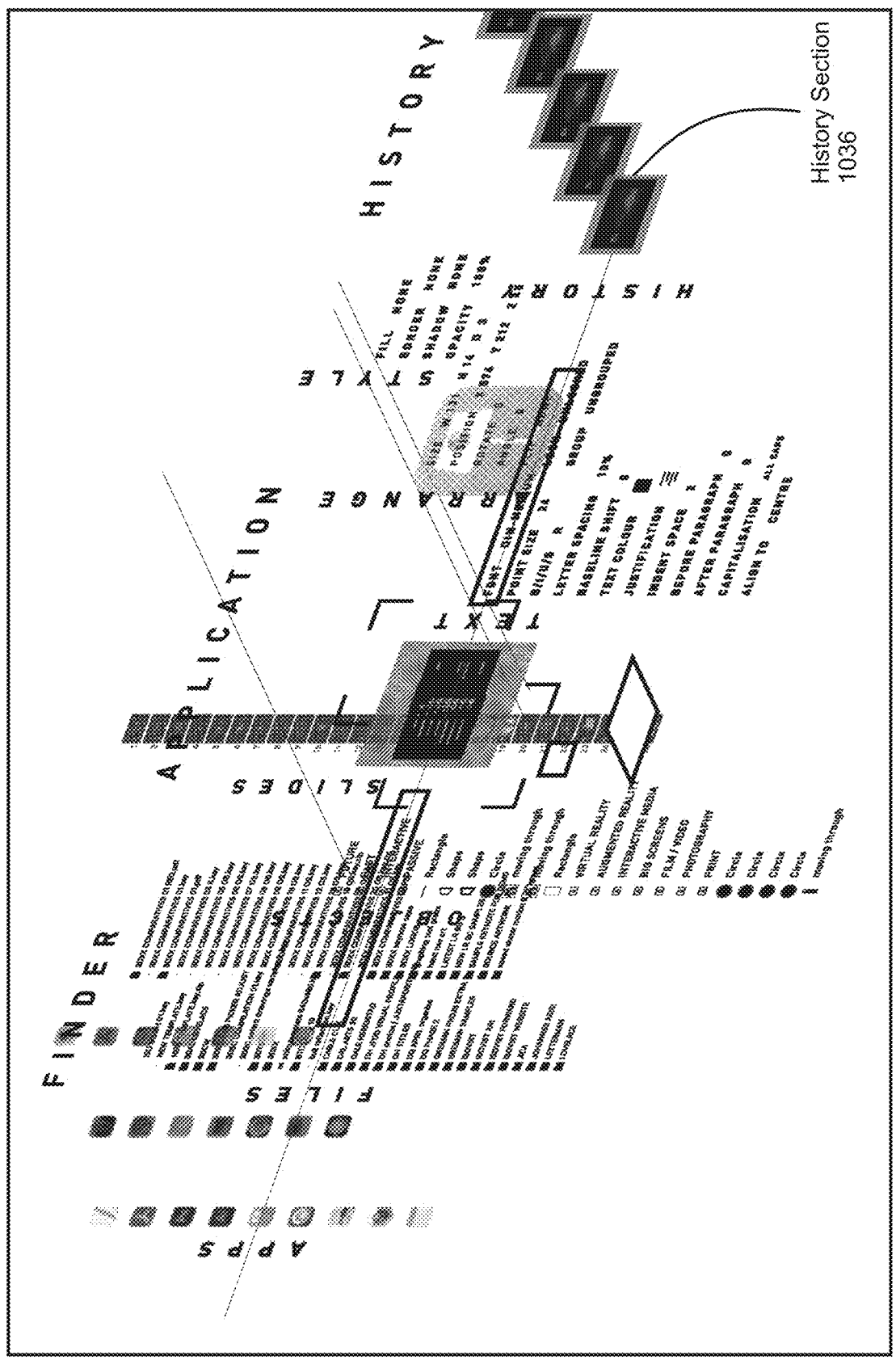

FIG. 10F depicts the isometric structure of zone user interface 1000 that includes history section 1036. Whenever a user interacts with zone user interface 1000, a snapshot of the view that results from the user interface is saved as a historical view. These snapshots are accessible via history section 1036, which enables a user to select any particular snapshot and return to that setup/view with minimal latency. It should be noted that the user does not see the finder on the left, or the history on the right from the user's perspective. The view in FIG. 10F simply provides awareness of where they are located and affect how the user gestures to access them.

FIGS. 12A-12F illustrate an example of navigation through another software application executed in an extended reality setting using the XR UI module 101. For example, another software application may be a spatial 3D XR software for group presentation and adjustments of architectural spaces. It is an example of how an interior design firm can present a client or team member (in same room or remotely) a design for, in this case, a floor in a high-rise building. A presenter would have access to the application and control what is viewed, and also make alterations to the design in real time.

Figure 12A:
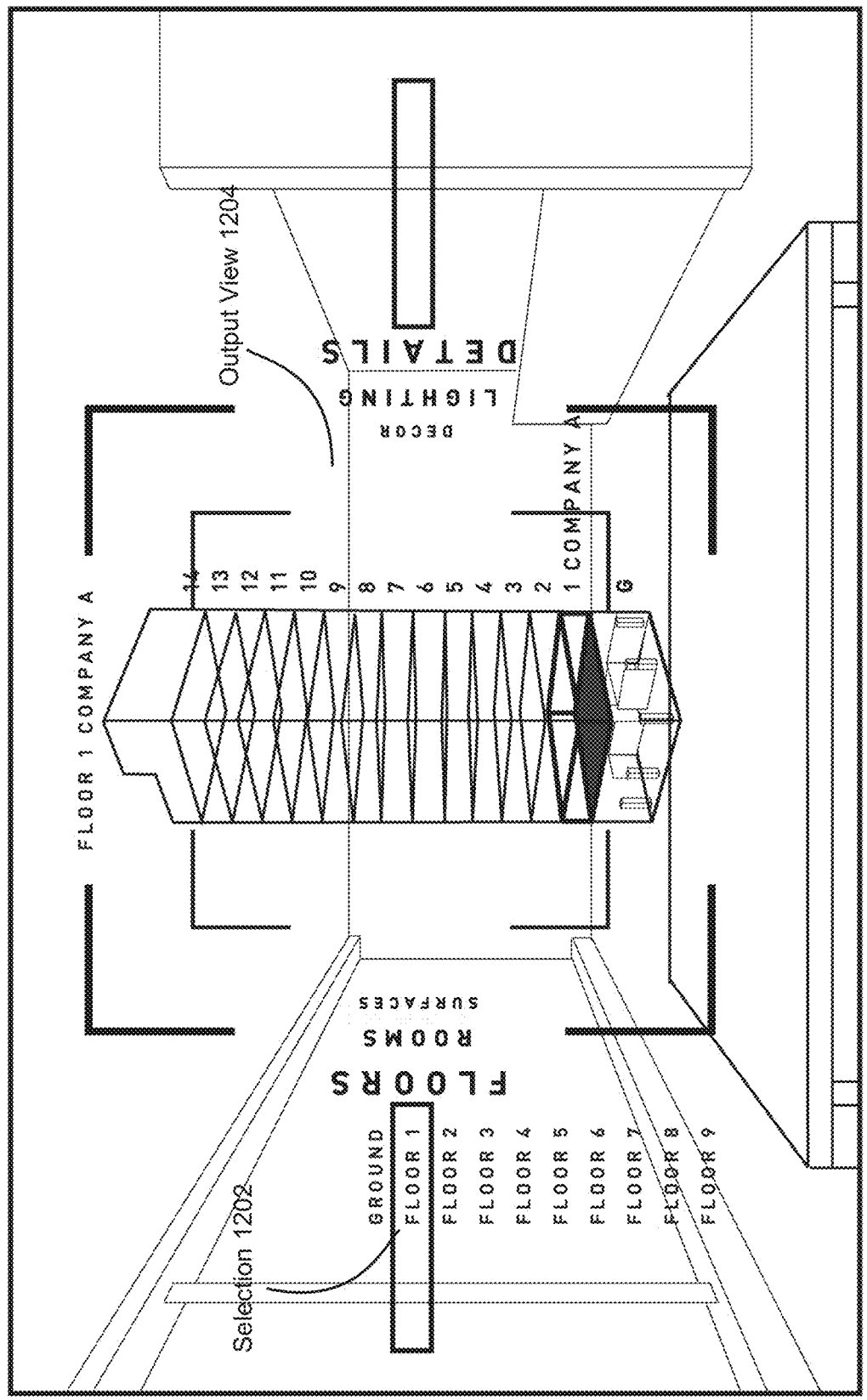
FIGS. 12A-12F illustrate an example of navigation through another software application executed in an extended reality setting using the exemplary user interface.
Figure 12B:
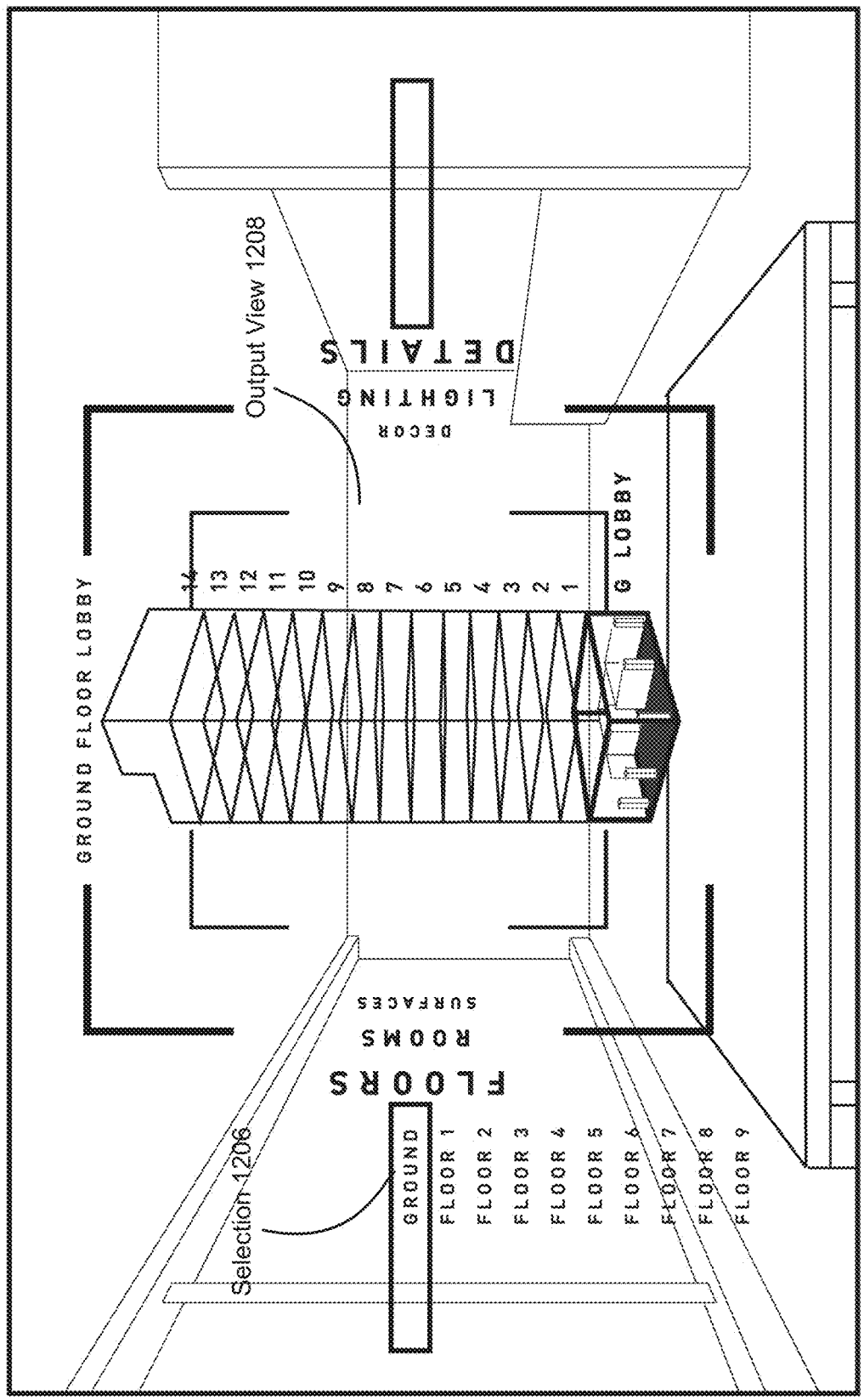

Following the zone structure described in FIG. 10A, FIG. 12A depicts an output view 1204 of a building in primary zone 1. Zone 2 includes multiple columns, namely, floors, rooms, and surfaces. Zone 3 too includes multiple columns, namely, details, lighting, and décor. It should be noted that the columns in zone 3 are empty until a selection is made in zone 2. For example, the user may scroll through the list of floors until the visual identifier encompasses selection 1202 (e.g., floor 1) of the building. In response, output view 1204 depicts floor 1 as highlighted. Suppose that the user scrolls downwards in zone 2 until the visual identifier encompasses selection 1206 instead (e.g., ground). In response, output view 1208 depicts the lobby on the ground as highlighted. This is shown in FIG. 12B.

In some aspects, the user may select a floor in primary zone 1 by selecting the floor from a list in zone 2. Suppose that the user selects the ground lobby by making a selection gesture (e.g., clicking/tapping/pointing on selection 1206 or swiping from left to right). This generates output view 1212 in FIG. 12C, which depicts an expanded view of the ground floor in primary zone 1 by which the user can view individual rooms in the selected floor. These rooms are also listed in zone 2 (e.g., reception, VIP lounge, lifts, etc.). In output view 1212, the reception area is highlighted by default because the "reception" is the default selection in zone 2 (i.e., selection 1210).

Figure 12C:
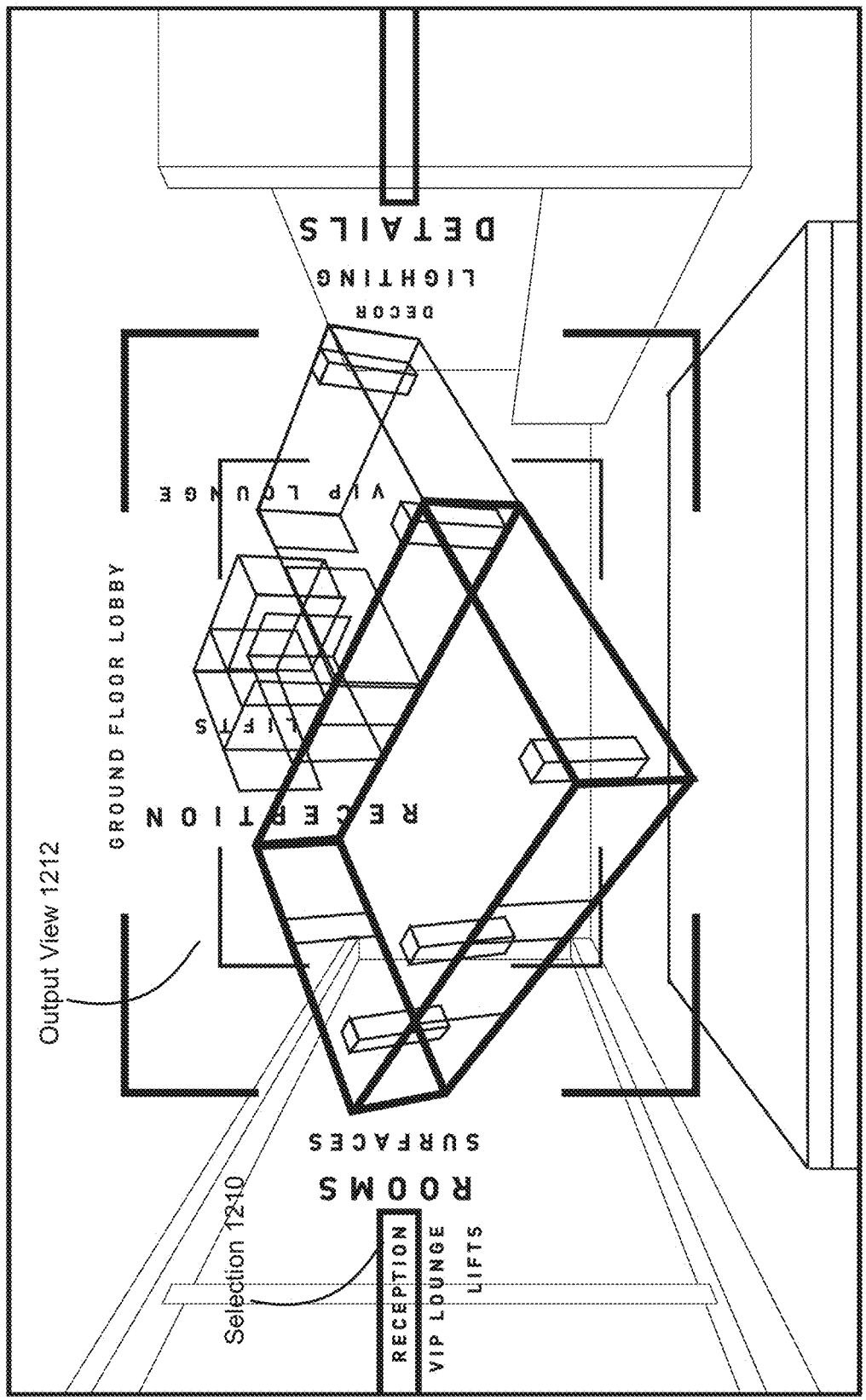

In another example, the user can select a different room (e.g., VIP lounge) in the selector on the left, by scrolling down the rooms in FIG. 12C and, when VIP lounge is in the visual indicator (selection 1214), swiping left to right to "open" options related to the VIP lounge. In response, the VIP lounge area is highlighted in output view 1216. This is shown in FIG. 12D.

Figure 12D:
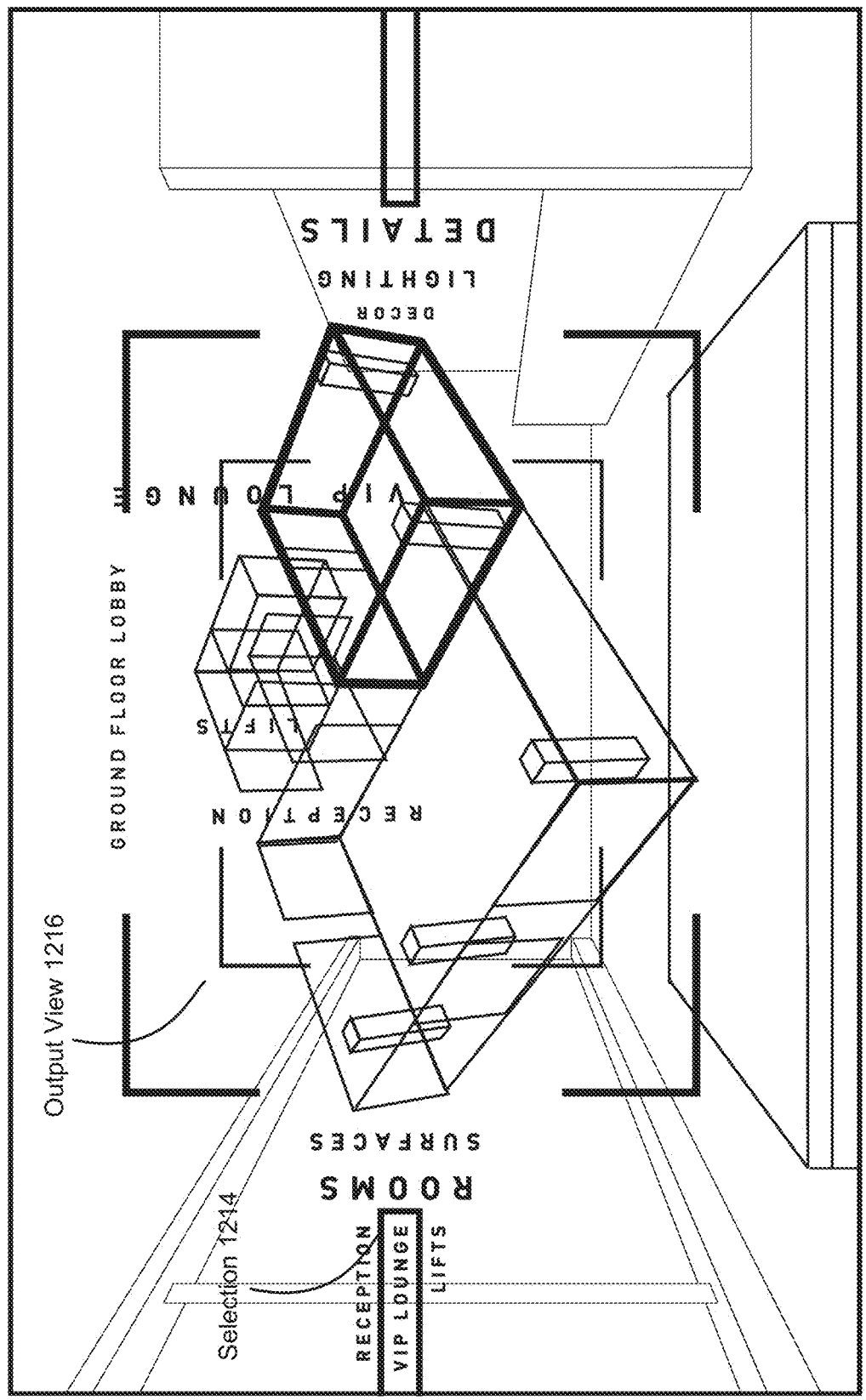

The user selection of rooms in FIG. 12D may be a very small room in a cluster of other small rooms (as in the upper back of the depicted floor model). Navigating a list of rooms on the left is more efficient for selection than trying to select within the model.

Figure 12E:
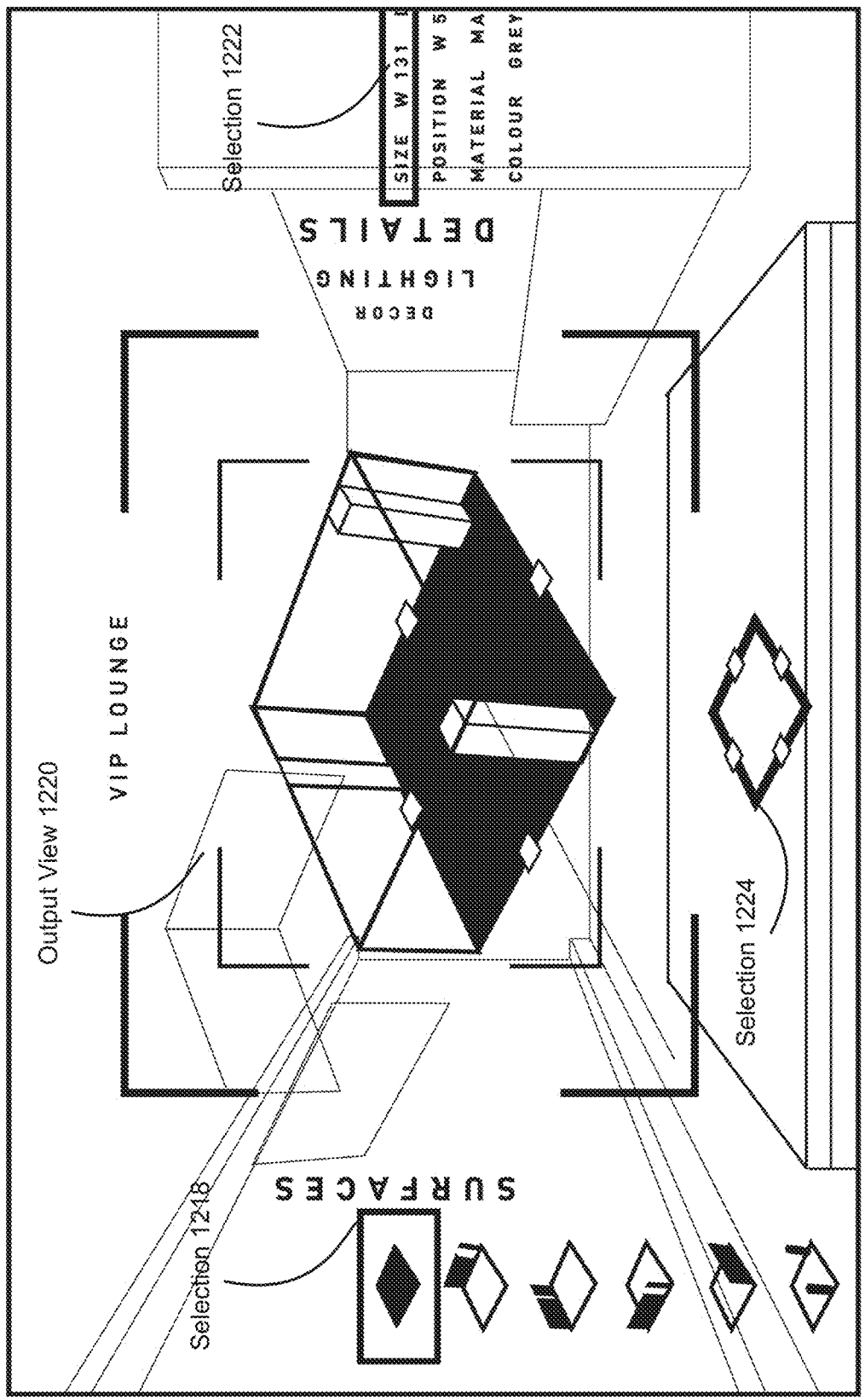

Suppose that the user selects selection 1214 (e.g., makes a tapping/swiping gesture). In response, the view shown in FIG. 12E is generated. In these cases, the object in zone 1 zooms forward to be in a zoomed showcase position. This zooming in and out avoids the potential disruptive nature of simply appearing in the zoomed up position and offers fluidity. More specifically, zone 2 lists the various selectable surfaces in the VIP lounge and primary zone 1 provides an expanded view of the VIP lounge. When the user selects selection 1218 (e.g., the floor), the details column in zone 3 is populated. The details column includes various editable attributes of the selected surface. For example, the user may edit the size of the floor. Suppose that the user selects selection 1222 (e.g., the size). In response, zone 4 is populated, which depicts the boundaries of the floor. A selection 1224 in zone 4 may ultimately change the boundaries or shape of the selected floor surface. In some aspects, the user may return to the selection of a room (i.e., the view in FIG. 12D) by swiping right to left to "close" the options related to the VIP to select another room.

Figure 12F:
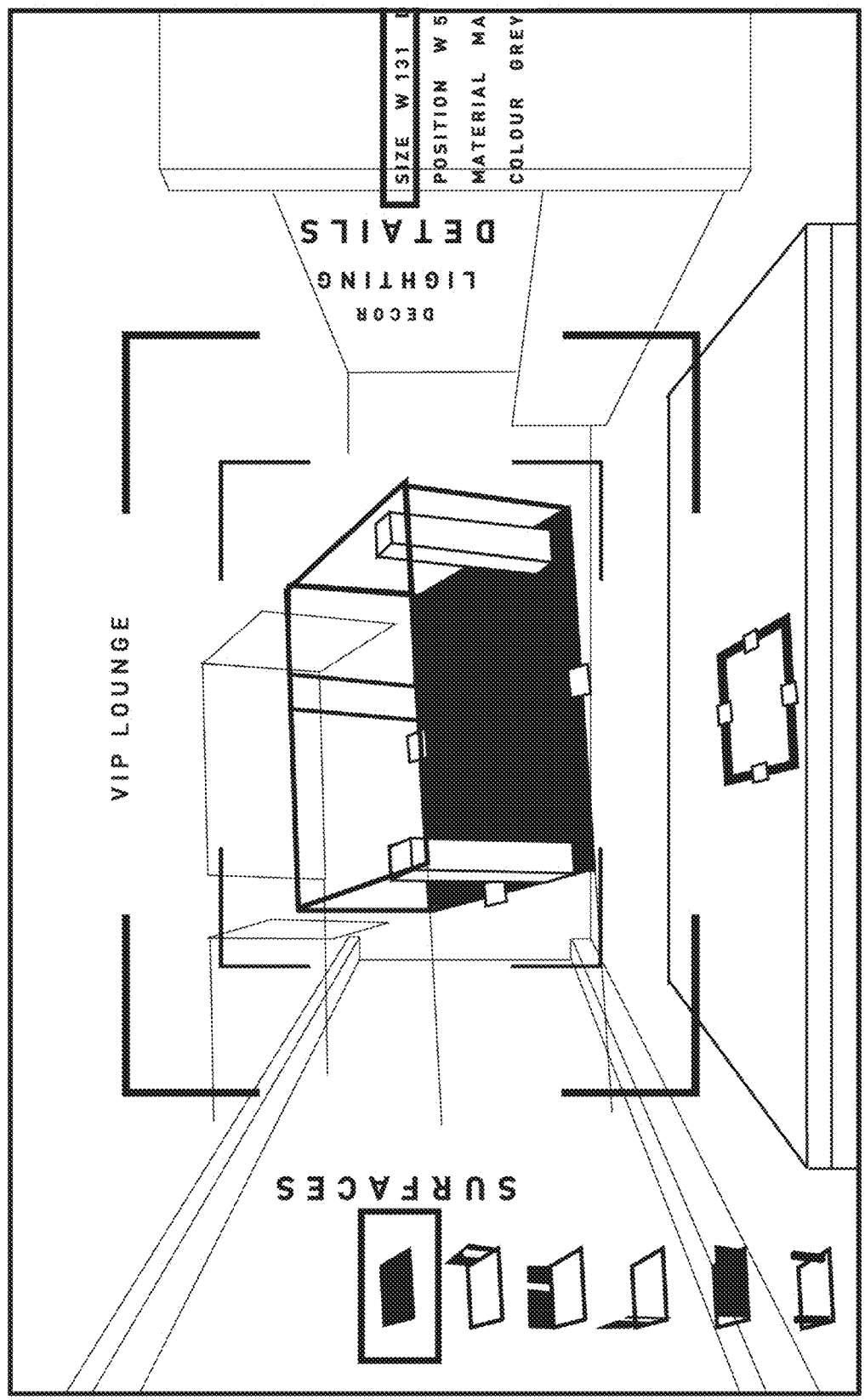

FIG. 12F illustrates how a user may interact with an element in zone 1, which affects how elements in zones 2, 3, and 4 are displayed. For example, a user may rotate the floor plan shown in zone 1 (e.g., by making motion 932). Accordingly, the element corresponding to the floor plan outline in zone 4 is rotated to match the rotation in zone 1. Similarly, the elements corresponding to the "surfaces" column are rotated to match the rotation in zone 1. This enables the user to clearly see which visual elements to select. If the elements in zone 2 and 4 remain static, the user may not be able to discern which surfaces to select in zone 1 as, depending on the rotation, some parts of the element in zone 1 may be get hidden or obscured (thus, the element as shown in zone 2 may not be detected by the user). In some aspects, the interaction shown in FIG. 12F works as follows: (1) a user presses and holds on zone 4, which causes the element in the zone to expand in size with number dimension label appearing above the edges, (2) the user moves his/her finger in the direction of the location of the edge of the floor they wish to alter to confirm visually on zone 1 that they have selected the correct edge, (3) the edge moves in real time and the data display of measurement changes in real time.

Figure 13:
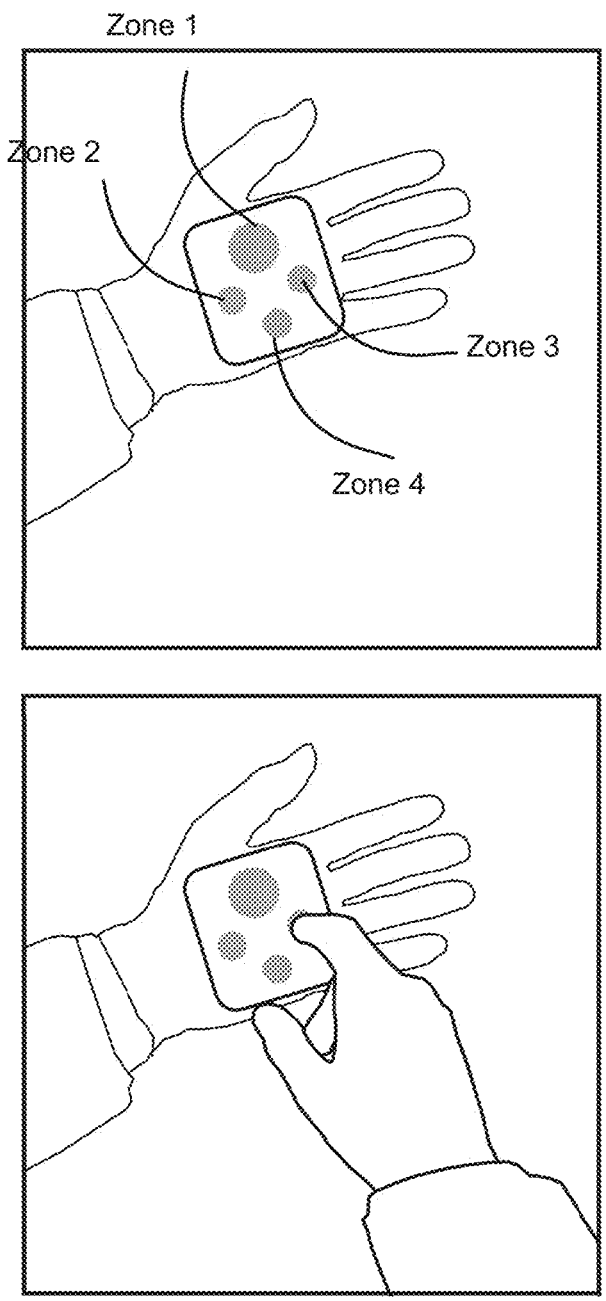
FIG. 13 illustrates mapping of the input-receiving elements of the user interface on a palm surface.

FIG. 13 illustrates mapping, as performed by XR UI module 101, of the input-receiving elements of the user interface on a palm surface. The gestures mentioned in the present disclosure resemble gestures that can be performed on a touch screen or mouse pad (e.g., tapping, clicking, scrolling, etc.). As mentioned previously, when the depth property is introduced in an extended reality setting, the complexity of user interaction becomes increasingly complex. Although science fiction media often depicts interactions involving pointing, pinching, and dragging objects arranged along varying depths, these interactions do not translate well in real world applications. For example, if a person points at a block in a cubic structure shown in FIG. 5, there is a high likelihood that due to the busy nature of the visual (closely arranged small blocks), the desired block will not be selected. In fact, the system will likely be unable to determine the level of depth the desired block is located in. The zone user interface improves the navigation through a busy visual (such as the cubic structure, the slide editor, the 3D modeling software, etc.), but this navigation is made more robust by mapping the zones onto a surface. In FIG. 13, the virtual zones of zone user interface are mapped to physical zones on a palm of the user. It should be noted that the circular areas shown in FIG. 13 are only demonstrative are not actually projected or drawn on the hand. They are discerned by software from a finger of one hand touching a specific area of the palm of the other hand.

The user may then perform gestures on the physical zones as though the surface is a touchscreen. For example, in FIG. 13, the user points and performs a gesture in a physical zone corresponding to zone 3. In some aspects, the mapping and gesture identification may be performed by a camera that is located in the environment where the user is located. In some aspects, the mapping and gesture identification may be performed by an on-board camera of extended reality device 100 and/or computing device 200. In some aspects, the size of each physical zone is proportional to the size of each virtual zone.

Figure 14:
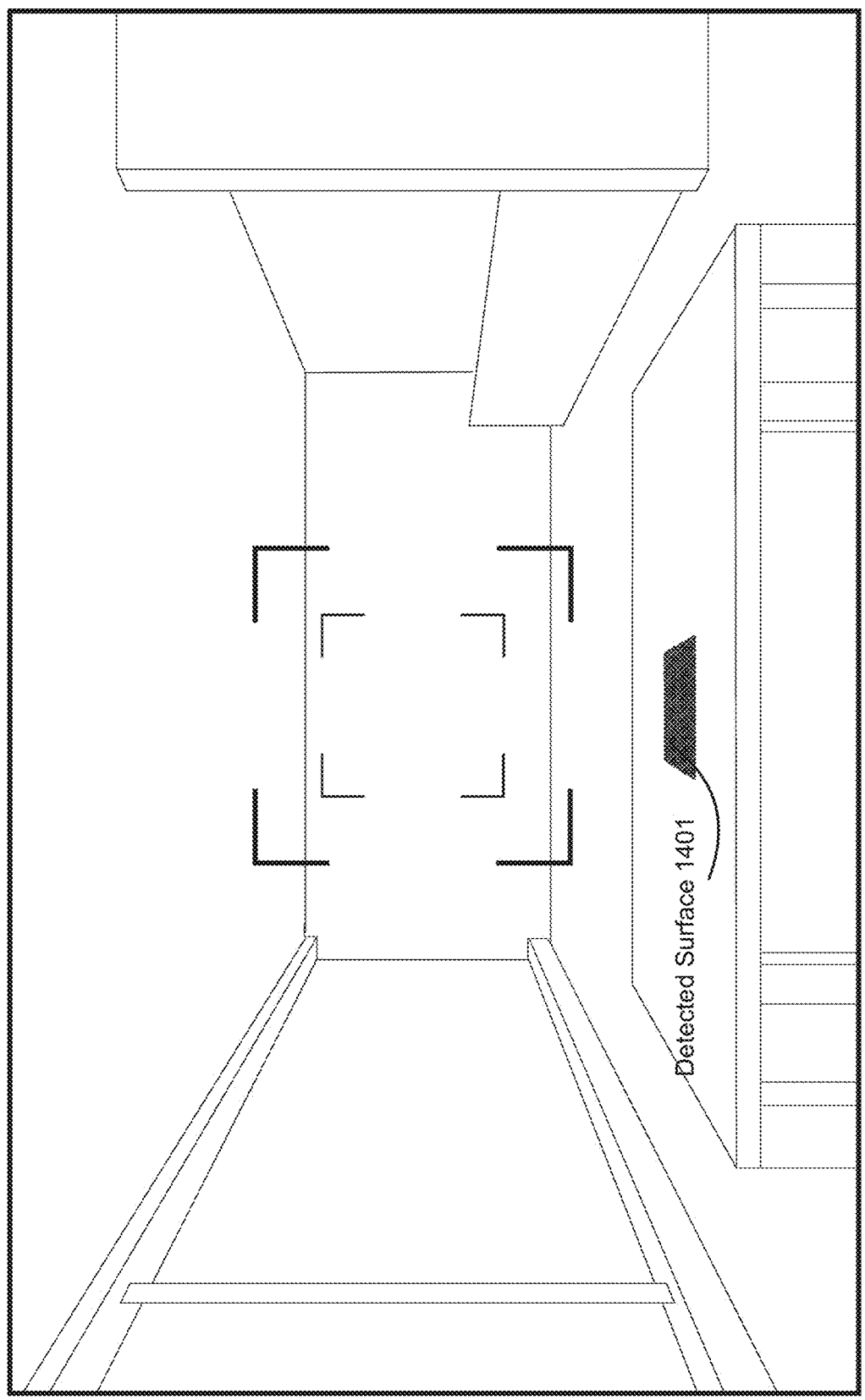
FIG. 14 illustrates mapping of the input-receiving elements of the user interface on a hard surface.

FIG. 14 illustrates mapping, as performed by XR UI module 101, of the input-receiving elements of the user interface on a hard surface. Mapping specifically refers to assigning one virtual zone to a physical zone (e.g., noting a correspondence between the two and storing the correspondence in memory). In an exemplary aspect, the surface on which the physical zones are identified may be a physical surface in the physical environment. For example, FIG. 14 depicts the view of the user while wearing extended reality device 100. The physical environment of the user includes detected surface 1401 (e.g., a paper) onto which the virtual zones are mappable. In some aspects, detected surface 1401 may be identified using a camera. There are two aspects to consider regarding the navigation surface: (1) 1 the rectangular area (e.g., physical area or touch area) of interaction defined, and (2) the zones that relate to this rectangular area.

In some aspects, detected surface 1401 may be a touch screen of a smartphone/tablet. The inputs may be received by the touch screen and transmitted to the extended reality device 100. It should be noted that the display of the tablet/smartphone may be off so long as the touch inputs can still be received and transmitted.

Figure 15:
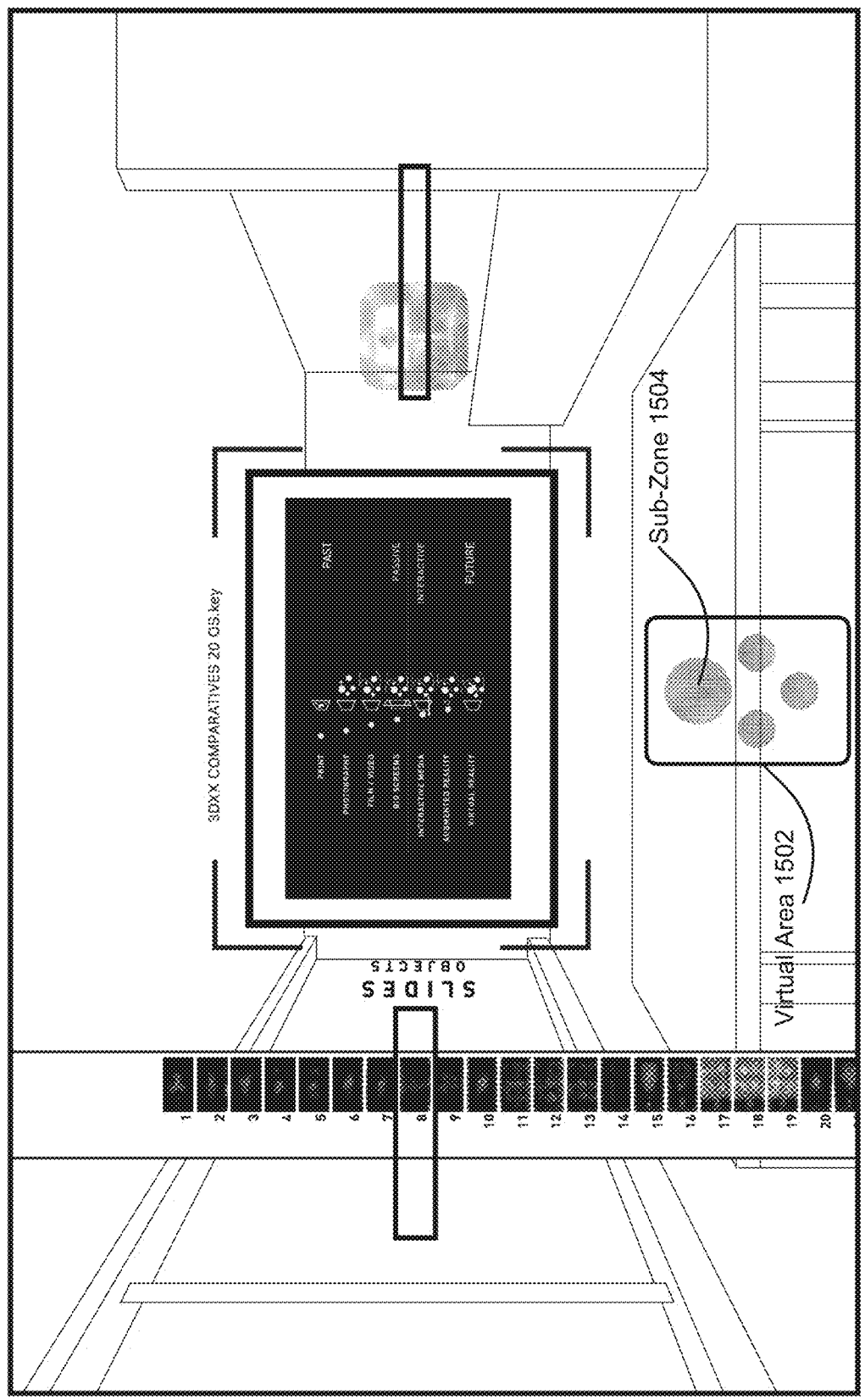
FIG. 15 illustrates mapping of the input-receiving elements of the user interface on a virtual interface.

FIG. 15 illustrates mapping, as performed by XR UI module 101, of the input-receiving elements of the user interface on a virtual area. In some aspects, the virtual zones may be presented on a virtual area 1502. For example, virtual area may be a transparent boundary (e.g., a rectangle) in which each zone on the zone user interface is mapped to a sub-zone of the virtual area. The user may interact with the sub-zone, which may translate to a command executed on the corresponding zone. For example, when the user makes a gesture in sub-zone 1504, a corresponding action is performed in zone 1. Because the virtual surface is not bound to any physical object in the environment, the user may place or relocate the virtual surface where he/she wishes. Ideally, however, if placed just below the interaction space (i.e., the display of zones 1,2,3,4) the user may see the virtual surface in their peripheral vision, which aids in placing their finger in the correct zones for navigation. Additionally, the user may use a gesture, such as a hand grab gesture, to "select" the virtual surface and move the surface to another position. In an example of a complex three-dimensional game, a user may be able to directly grab the vertical arrays in zones 2 and 3, grab the main game object in zone 1, and with the help of interaction proxies at the bottom, navigate the zonal displays directly (e.g., using pinch as an example of selection).

Figure 16:
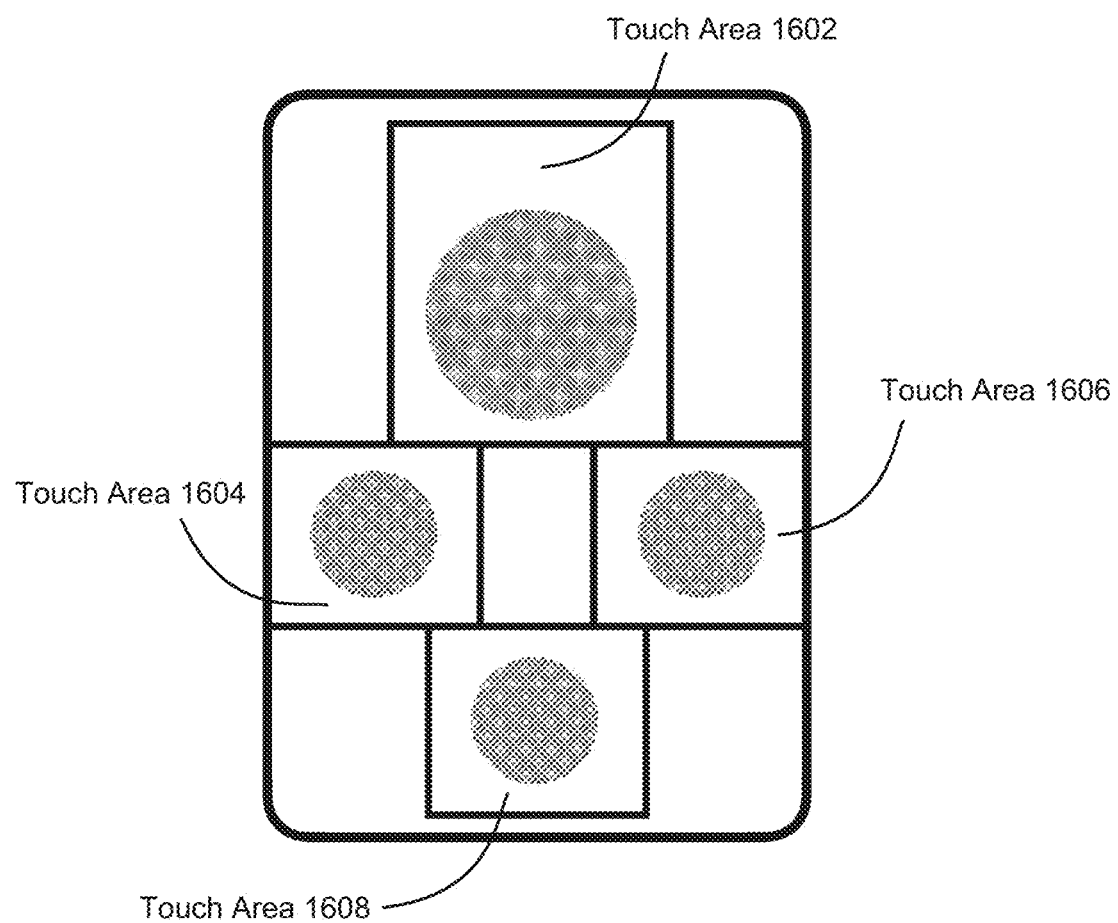
FIG. 16 illustrates touch areas/physical zones associated with zones on a virtual interface.

As shown in FIG. 16, XR UI module 101 identifies touch areas (interchangeable with physical zones) 1602, 1604, 1606, and 1608 on detected surface 1401. Each physical zone corresponds to a virtual zone in a similar placement. For example, touch area 1602 is mapped to primary zone 1, touch area 1604 is mapped to zone 2, touch area 1606 is mapped to zone 3, and touch area 1608 is mapped to zone 4. When a gesture is detected in touch area 1604, for example, the command associated with the gesture is executed in zone 2. Suppose that the user performs motion 902 in touch area 1602. In response to identifying the motion (e.g., via a camera) and the corresponding virtual zone (i.e., zone 2), XR UI module 101 executes the command in zone 2.

Figure 17:
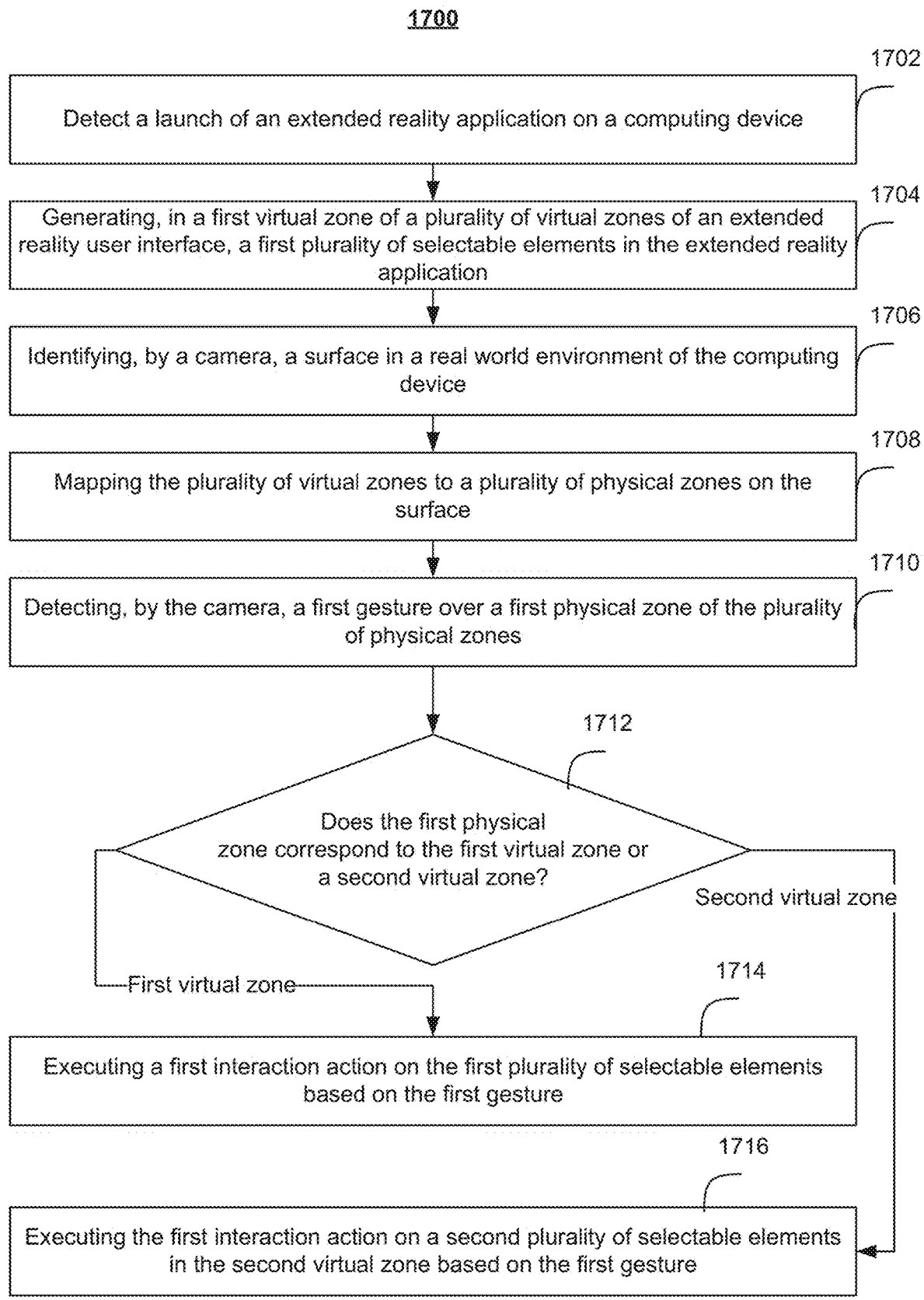
FIG. 17 is a flow diagram illustrating a method for generating and enabling interaction with an extended reality user interface.

FIG. 17 illustrates a flow diagram of a method 1700 for generating and enabling interaction with an extended reality device. At 1702, XR UI module 101 detects a launch of an extended reality application (e.g., a slide editor, a game, a 3D modeling software, etc.) on a computing device (e.g., computing device 200, extended reality device 100.

At 1704, XR UI module 101 generates, in a first virtual zone (e.g., zone 2) of a plurality of virtual zones (e.g., primary zone 1, zone 2, zone 3, zone 4) of an extended reality user interface (used interchangeably with zone user interface), a first plurality of selectable elements in the extended reality application. For example, referring to FIG. 10D, the first plurality of selectable elements may be a list of slides in a selected slide deck. Each element may be a thumbnail that represents a slide in the list.

At 1706, XR UI module 101 identifies (e.g., by sensor(s) 104, sensor(s) 202, etc.) a surface in a real world environment of the computing device. In some aspects, the surface is one of: a hand of a user (e.g., as shown in FIG. 13) and a flat surface in front of the user (e.g., as shown in FIG. 14), in which case the surface is identified by a camera. In some aspects, the surface is a touchscreen, a track pad on a game controller/remote device, etc., in which case, the surface is identified based on receipt of a user input on said surface. In this case, there is a distinct difference between a touchscreen surface on a device that also displays the XR application and graphics and a peripheral device that solely receives use input (e.g., a wirelessly connect smartphone whose touchscreen is used despite the display of the smartphone being off and not displaying anything).

Suppose that the surface is identified using a camera. For example, XR UI module 101 may identify detected surface 1401. In some aspects, when identifying a surface, XR UI module 101 may look for preprogrammed surfaces such as the palm of a user, a piece of blank paper, an empty table, etc., using image classification techniques. In some aspects, XR UI module 101 may determine that the classified surface is a candidate for mapping virtual zones in response to determining that a size of the detected surface meets a predetermined size and shape requirements. For example, a predetermined size and shape requirement may be that the shape needs to be a square or rectangle with at least 5 inches in width and 5 inches in height. XR UI module 101 may receive one or more image frames from a camera of the extended reality device 100 and may search for surfaces within reach of the user's arms (e.g., in the lower third pixels of the received image frames) that are classified as a preprogrammed object (e.g., a paper, a folder, a table, etc.) and meet the size and shape requirements of a candidate surface. In response to detecting surface 1401, for example, XR UI module 101 may determine that surface 1401 is a paper that meets the predetermined size and shape requirements.

In some aspects, XR UI module 101 may detect a physical object (e.g., a paper) that comprises the surface in the real world environment. XR UI module 101 may generate, on the extended reality user interface, a virtual object that visually corresponds to the physical object. For example, XR UI module 101 may generate a virtual paper that appears like the real world physical paper. XR UI module 101 may then generate a visual of the first gesture on the virtual object. This enables a user to reference their gestures on the virtual object if needed.

In some aspects, XR UI module 101 may receive a request to change the surface. For example, XR UI module 101 may detect a paper on a table in front of the user, but the user may not prefer using that paper as a trackpad. In some aspects, the request may include an explicit selection of another surface. For example, the user may select his/her palm to be the surface. In response to receiving the request, XR UI module 101 identifies, by the camera, another surface in the real world environment (e.g., the palm) and maps the plurality of virtual zones to a plurality of physical zones on the another surface. Accordingly, the user has flexibility to change surfaces. In some aspects, a user may be interacting with an extended reality application and midway may decide to change the surface on which the interaction is performed. For example, the user may be wearing an extended reality device 100 and sitting in front of a desk. Initially, the physical zones may be identified on the table. Suppose that while interacting with the extended reality application, the user gets up and begins walking. XR UI module 101 may detect that the surface (e.g., the table) is no longer accessible, and may identify the user's palm as the surface onto which the physical zones should be identified.

At 1708, XR UI module 101 maps the plurality of virtual zones to a plurality of physical zones on the surface. For example, the extended reality user interface may include primary zone 1, zones 2, zone 3, and zone 4. XR UI module 101 may virtually mark physical zones (e.g., touch areas 1602, 1604, 1606, and 1608) on detected surface 1401 as shown in FIG. 14. XR UI module 101 may then map each virtual zone with a physical zone. For example, XR UI module 101 maps touch area 1602 to primary zone 1, maps touch area 1604 to zone 2, maps touch area 1606 to zone 3, and maps touch area 1608 to zone 4. On a technical level, mapping may involve storing, in a relations database, an indication that touch area 1602, for example, has a certain dimension and position in the extended reality setting, which directly relate to zone 1.

At 1710, XR UI module 101 detects a first gesture over a first physical zone of the plurality of physical zones. Again, this detection may be performed using a camera or the touchscreen of a peripheral device connected to the computing device outputting the XR application. For example, XR UI module 101 may receive a plurality of consecutive image frames from the camera that show a pointer finger of the user moving in a motion resembling motion 902. In particular, the pointer finger may be touching or hovering over a particular physical zone during the first gesture. It should be noted that although XR UI module 101 identifies the pointer finger as the object to track in this example, XR UI module 101 may be programmed to track any other object such as a stylus, a handle, multiple fingers, a pen, a pencil, and arm, etc.

At 1712, XR UI module 101 determines whether the first physical zone corresponds to the first virtual zone (e.g., zone 2) or a second virtual zone (e.g., zone 3). In response to determining that the first physical zone corresponds to the first virtual zone, method 1700 advances to 1714, where XR UI module 101 executes a first interaction action on the first plurality of selectable elements based on the first gesture. In response to determining that the first physical zone corresponds to the second virtual zone, method 1700 advances to 1716, where XR UI module 101 executes the first interaction action on a second plurality of selectable elements in the second virtual zone based on the first gesture.

In general, when a gesture is detected in a physical zone such as physical zone 12, the interaction action associated with the gesture is executed in the corresponding virtual zone. Suppose that the user performs a gesture corresponding to motion 902 in physical zone 12. In response to identifying the motion (e.g., via a camera) and the corresponding virtual zone (e.g., zone 2), XR UI module 101 executes the action(s) associated with the motion in zone 2.

In some aspects, the first gesture is associated with a selection. For example, the user may make a pointing gesture (e.g., pointing a finger at a location in the physical zone and retracting the finger immediately after). In this case, when executing the first interaction action, XR UI module 101 selects a first element (e.g., selected element 1016) from the first plurality of selectable elements (e.g., organized as element columns 1010, 1012, and 1014). More specifically, a virtual location of the first element in the first virtual zone corresponds to a physical location last touched in the first physical zone during the first gesture (e.g., the location of the finger before retraction). Based on this gesture, the first interaction action involves generating an output view associated with the first element in a primary virtual zone of the plurality of virtual zones. For example, if the selected element is a slide thumbnail as shown in FIG. 10D, sub-element 1026 is generated for view in primary zone 1.

In some aspects, the first gesture is associated with a vertical scroll with a single finger (e.g., motion 902). In this case, when executing the first interaction action, XR UI module 101 slides the plurality of selectable elements along a vertical axis until a desired selectable element enters a fixed indicator (e.g., visual identifier 1024). The direction of the sliding corresponds to a direction of the first gesture on the surface. For example, the user may slide his/her finger in an upward direction in the first virtual zone. In response, XR UI module 101 may move the list of slides shown in FIG. 10D upward. The amount of virtual displacement of the elements is proportional to the distance that the finger moves in the physical zone. When the user ends the gesture (e.g., by retracting his/her finger), the element within visual identifier 1024 is considered the selection.

In some aspects, the first gesture is associated with a vertical scroll with two fingers. Suppose that the first plurality of selectable elements is organized in more than one column (e.g., sub-element column 1019 and sub-element column 1020). When executing the first interaction action, XR UI module 101 slides across the more than one column arranged along a depth axis. Here, the direction of the sliding is based on a direction of the first gesture on the surface. This gesture may correspond to motion 912 shown in FIG. 9B.

It should be noted that after detecting the first gesture, XR UI module 101 may detect, by the camera, a second gesture over a second physical zone of the plurality of physical zones. Suppose that the second virtual zone (e.g., zone 3) of the plurality of virtual zones outputs a second plurality of selectable elements (e.g., shown in type 1 element column 1030, type 2 element column 1032, and type 3 element column 1034). In response to determining that the second physical zone corresponds to the second virtual zone of the plurality of virtual zones, XR UI module 101 executes another interaction action on the second plurality of selectable elements based on the second gesture. For example, the second gesture may correspond to motion 914 and the another interaction action may involve scrolling through and selecting one of the element columns 1030, 1032, and 1034.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for generating and enabling interaction with an extended reality user interface, the method comprising:
   detecting a launch of an extended reality application on a computing device;
   generating, in a first virtual zone of a plurality of virtual zones in an extended reality user interface, a first plurality of selectable elements in the extended reality application;
   identifying a surface of a physical object in a real world environment of the computing device;
   mapping the plurality of virtual zones to a plurality of physical zones on the surface of the physical object such that gestures made on a respective physical zone on the surface of the physical object trigger executions of interactions actions on a respective virtual zone mapped to the respective physical zone, wherein the mapping comprises:
      assigning (1) a first physical zone to a first virtual zone situated on a left-side of the extended reality application, (2) a second physical zone to a second virtual zone situated on a right-side of the extended reality application, (3) a third physical zone to a third virtual zone situated on a bottom-side of the extended reality application, and (4) a fourth physical zone to a primary virtual zone situated on a center area of the extended reality application,
      wherein relative positions of each of the plurality of physical zones on the physical surface match relative positions of each of the plurality of virtual zones on the extended reality application,
      wherein each virtual zone of the plurality of virtual zones is configured to execute specific commands based on input gestures received via the plurality of physical zones such that the first virtual zone and the second virtual zone execute commands for scrolling and selecting listed elements, the primary virtual zone executes commands for viewing a selected element from the listed elements, and the third virtual zone executes commands for modifying the selected element;
   detecting a first gesture made in contact with a first physical zone of the plurality of physical zones of the physical object; and
   in response to determining that the first physical zone corresponds to the first virtual zone, executing a first interaction action on the first plurality of selectable elements based on the first gesture.

2. The method of claim 1, further comprising:
   detecting the physical object that comprises the surface in the real world environment;
   generating, on the extended reality user interface, a virtual object that visually corresponds to the physical object; and
   generating a visual of the first gesture on the virtual object.

3. A method of claim 1, further comprising:
   receiving a request to change the surface;
   in response to receiving the request, identifying, by a camera, another surface in the real world environment; and
   mapping the plurality of virtual zones to a plurality of physical zones on the another surface.

4. The method of claim 3, wherein the request comprises a selection of the another surface.

5. The method of claim 1, wherein the surface is one of: a hand of a user and a flat surface in front of the user.

6. The method of claim 1, wherein the first gesture is associated with a selection, and wherein executing the first interaction action comprises:
   selecting a first element from the first plurality of selectable elements, wherein a virtual location of the first element in the first virtual zone corresponds to a physical location last touched in the first physical zone during the first gesture; and
   generating an output view associated with the first element in the primary virtual zone of the plurality of virtual zones.

7. The method of claim 1, wherein the first gesture is associated with a vertical scroll with a single finger, and wherein executing the first interaction action comprises:
   sliding the plurality of selectable elements along a vertical axis until a desired selectable element enters a fixed indicator, wherein a direction of the sliding corresponds to a direction of the first gesture on the surface.

8. The method of claim 1, wherein the first gesture is associated with a vertical scroll with two fingers, wherein the first plurality of selectable elements are organized in more than one column, and wherein executing the first interaction action comprises:
   sliding across the more than one column arranged along a depth axis, wherein a direction of the sliding is based on a direction of the first gesture on the surface.

9. The method of claim 1, wherein the second virtual zone of the plurality of virtual zones outputs a second plurality of selectable elements, further comprising:
   detecting a second gesture over the second physical zone of the plurality of physical zones; and
   in response to determining that the second physical zone corresponds to the second virtual zone of the plurality of virtual zones, executing another interaction action on the second plurality of selectable elements based on the second gesture.

10. The method of claim 1, wherein the extended reality application has one or more of virtual reality features, augmented reality features, and mixed reality features.

11. A system for generating and enabling interaction with an extended reality user interface, comprising:
   at least one memory; and
   at least one hardware processor coupled with the at least one memory and configured, individually or in combination, to:
      detect a launch of an extended reality application on a computing device;

generate, in a first virtual zone of a plurality of virtual zones in an extended reality user interface, a first plurality of selectable elements in the extended reality application;

identify a surface of a physical object in a real world environment of the computing device;

map the plurality of virtual zones to a plurality of physical zones on the surface of the physical object such that gestures made on a respective physical zone on the surface trigger execution of interactions actions on a respective virtual zone mapped to the respective physical zone of the physical object, wherein the mapping comprises:

assigning (1) a first physical zone to a first virtual zone situated on a left-side of the extended reality application, (2) a second physical zone to a second virtual zone situated on a right-side of the extended reality application, (3) a third physical zone to a third virtual zone situated on a bottom-side of the extended reality application, and (4) a fourth physical zone to a primary virtual zone situated on a center area of the extended reality application, wherein relative positions of each of the plurality of physical zones on the physical surface match relative positions of each of the plurality of virtual zones on the extended reality application, wherein each virtual zone of the plurality of virtual zones is configured to execute specific commands based on input gestures received via the plurality of physical zones such that the first virtual zone and the second virtual zone execute commands for scrolling and selecting listed elements, the primary virtual zone executes commands for viewing a selected element from the listed elements, and the third virtual zone executes commands for modifying the selected element;

detect a first gesture made in contact with a first physical zone of the plurality of physical zones of the physical object; and in response to determining that the first physical zone corresponds to the first virtual zone, execute a first interaction action on the first plurality of selectable elements based on the first gesture.

12. The system of claim 11, wherein the at least one hardware processor is further configured to:

detect the physical object that comprises the surface in the real world environment;

generate, on the extended reality user interface, a virtual object that visually corresponds to the physical object; and generate a visual of the first gesture on the virtual object.

13. The system of claim 11, wherein the at least one hardware processor is further configured to:

receive a request to change the surface;

in response to receiving the request, identify, by a camera, another surface in the real world environment; and map the plurality of virtual zones to a plurality of physical zones on the another surface.

14. The system of claim 13, wherein the request comprises a selection of the another surface.

15. The system of claim 11, wherein the surface is one of: a hand of a user and a flat surface in front of the user.

16. The system of claim 11, wherein the first gesture is associated with a selection, and wherein the at least one hardware processor is further configured to execute the first interaction action by:

selecting a first element from the first plurality of selectable elements, wherein a virtual location of the first element in the first virtual zone corresponds to a physical location last touched in the first physical zone during the first gesture; and generating an output view associated with the first element in the primary virtual zone of the plurality of virtual zones.

17. The system of claim 11, wherein the first gesture is associated with a vertical scroll with a single finger, and wherein the at least one hardware processor is further configured to execute the first interaction action by:

sliding the plurality of selectable elements along a vertical axis until a desired selectable element enters a fixed indicator, wherein a direction of the sliding corresponds to a direction of the first gesture on the surface.

18. The system of claim 11, wherein the first gesture is associated with a vertical scroll with two fingers, wherein the first plurality of selectable elements are organized in more than one column, and wherein the at least one hardware processor is further configured to execute the first interaction action by:

sliding across the more than one column arranged along a depth axis, wherein a direction of the sliding is based on a direction of the first gesture on the surface.

19. The system of claim 11, wherein the second virtual zone of the plurality of virtual zones outputs a second plurality of selectable elements, wherein the at least one hardware processor is further configured to:

detect a second gesture over the second physical zone of the plurality of physical zones; and in response to determining that the second physical zone corresponds to the second virtual zone of the plurality of virtual zones, execute another interaction action on the second plurality of selectable elements based on the second gesture.

20. A non-transitory computer readable medium storing thereon computer executable instructions for generating and enabling interaction with an extended reality user interface, including instructions for:

detecting a launch of an extended reality application on a computing device;

generating, in a first virtual zone of a plurality of virtual zones in an extended reality user interface, a first plurality of selectable elements in the extended reality application;

identifying a surface of a physical object in a real world environment of the computing device;

mapping the plurality of virtual zones to a plurality of physical zones on the surface of the physical object such that gestures made on a respective physical zone on the surface of the physical object trigger executions of interactions actions on a respective virtual zone mapped to the respective physical zone, wherein the mapping comprises:

assigning (1) a first physical zone to a first virtual zone situated on a left-side of the extended reality application, (2) a second physical zone to a second virtual zone situated on a right-side of the extended reality application, (3) a third physical zone to a third virtual zone situated on a bottom-side of the extended reality application, and (4) a fourth physical zone to a primary virtual zone situated on a center area of the extended reality application, wherein relative positions of each of the plurality of physical zones on the physical surface match relative positions of each of the plurality of virtual zones on the extended reality application, wherein each virtual zone of the plurality of virtual zones is configured to execute specific commands based on input gestures received via the plurality of physical zones such that the first virtual zone and the second virtual zone execute commands for scrolling and selecting listed elements, the primary virtual zone executes commands for viewing a selected element from the listed elements, and the third virtual zone executes commands for modifying the selected element;

detecting a first gesture made in contact with a first physical zone of the plurality of physical zones of the physical object; and in response to determining that the first physical zone corresponds to the first virtual zone, executing a first interaction action on the first plurality of selectable elements based on the first gesture.

\* \* \* \* \*